(12) United States Patent
Shacklette

(10) Patent No.: US 8,195,016 B2
(45) Date of Patent: *Jun. 5, 2012

(54) OPTICAL FIBER SWITCH INCLUDING AN INDEX MATCHING ELASTOMERIC SOLID LAYER AND RELATED METHODS

(75) Inventor: Lawrence Wayne Shacklette, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 353 days.

This patent is subject to a terminal disclaimer.

(21) Appl. No.: 12/610,420

(22) Filed: Nov. 2, 2009

(65) Prior Publication Data

US 2011/0103740 A1    May 5, 2011

(51) Int. Cl.
  *G02B 6/26* (2006.01)
(52) U.S. Cl. ............... 385/16; 385/22; 385/141; 385/53; 29/428
(58) Field of Classification Search .................... 385/16, 385/22, 53, 28, 23, 55, 60, 70, 141–145; 29/428, 458; 264/1.25
See application file for complete search history.

(56) References Cited

U.S. PATENT DOCUMENTS

| | | | |
|---|---|---|---|
| 3,963,323 A | 6/1976 | Arnold | 350/96 |
| 4,325,607 A | 4/1982 | Carlsen | 350/96.21 |
| 4,930,859 A | 6/1990 | Hoffman, III | 350/96.21 |
| 5,058,983 A | 10/1991 | Corke et al. | 385/78 |
| 5,263,103 A | 11/1993 | Kosinski | 385/31 |
| 5,515,465 A | 5/1996 | Olin et al. | 385/64 |
| 5,619,610 A | 4/1997 | King et al. | 385/139 |
| 5,778,127 A * | 7/1998 | Gilliland et al. | 385/92 |
| 6,005,993 A | 12/1999 | MacDonald | 385/16 |
| 6,097,873 A | 8/2000 | Filas et al. | 385/140 |
| 6,280,099 B1 * | 8/2001 | Wu | 385/73 |
| 6,393,175 B1 * | 5/2002 | Jurbergs et al. | 385/20 |
| 6,463,192 B1 | 10/2002 | Kapany | 385/17 |

(Continued)

FOREIGN PATENT DOCUMENTS

EP    0 592 902    4/1994

(Continued)

OTHER PUBLICATIONS

Beddows et al., *The Application of Frustrated Total Reflection Devices to Analytical Laser Spectroscopy*, pp. 125-127, 2002 OSA/LIBS.

(Continued)

*Primary Examiner* — Ellen Kim
(74) *Attorney, Agent, or Firm* — Allen, Dyer, Doppelt, Milbrath & Gilchrist, P.A.

(57) ABSTRACT

An optical fiber switch which may include first and second angled optical fibers having respective first and second end faces. Each of the first and second angled optical fibers may include a core having a core index of refraction, and a cladding surrounding the core and having a cladding index of refraction less than the core index of refraction. The optical fiber switch may further include a first index matching elastomeric solid layer having a proximal face coupled to the first end face, and a distal face opposite the proximal face to be repeatably optically coupled to the second end face. The first index matching elastomeric solid layer may have an index of refraction matching at least the index of refraction of the core. The optical fiber switch may also include at least one actuator for relatively moving the first and second angled optical fibers between a coupled position and an uncoupled position.

20 Claims, 23 Drawing Sheets

U.S. PATENT DOCUMENTS

| | | | |
|---|---|---|---|
| 6,501,900 B1 | 12/2002 | King et al. | 385/140 |
| 6,748,132 B1 | 6/2004 | Kapany et al. | 385/24 |
| 6,789,953 B1 * | 9/2004 | deJong et al. | 385/73 |
| 6,873,448 B2 * | 3/2005 | Togawa et al. | 359/226.1 |
| 6,873,757 B2 * | 3/2005 | Li et al. | 385/22 |
| 7,079,725 B2 | 7/2006 | Sherrer et al. | 385/16 |
| 7,171,069 B1 | 1/2007 | Laughlin | 385/18 |
| 7,404,679 B2 | 7/2008 | Ebbutt et al. | 385/78 |
| 7,512,294 B2 | 3/2009 | Wang et al. | 385/13 |
| 2008/0075414 A1 | 3/2008 | Van Ostrand | 385/146 |
| 2008/0226232 A1 | 9/2008 | Bulthuis et al. | 385/37 |

FOREIGN PATENT DOCUMENTS

| | | |
|---|---|---|
| EP | 1 918 746 | 5/2008 |
| JP | 56 055905 | 5/1981 |
| JP | 1 285915 | 11/1989 |

OTHER PUBLICATIONS

Laughlin et al., *Frustrated Total Internal Reflection an Alternative for Optical Cross-Connect Architectures*, 1998, IEEE.

Filas et al., *Index Matching Elastomers for Fiber Optics*, IEEE Transactions on Components, 1990, vol. 13, No. 1.

* cited by examiner

|  | Monomer | Component Density (kg/L) | Component RI (Liquid at 589nm) RI |
|---|---|---|---|
| Component A: | F8DA | 1.43 | 1.3937 |
| Component B: | PNGDA | 1.005 | 1.45 |
| Component C: | TFPM | 1.215 | 1.373 |
| Component D: | IOA | 0.88 | 1.4346 |
| Component E: | EBDA-10 | 1.126 | 1.5142 |

Table 18.1

| EIMM-200 | F8DA (vol%) | PNGDA (vol%) | TFPM (vol%) | IOA (vol%) | EBDA-10 (vol%) |
|---|---|---|---|---|---|
| Core: |  | 82 | 18 |  |  |
| Clad: | 20 | 28 | 17.2 | 34.8 |  |

Table 18.2

| Densification upon Cure (δ) | Dispersion Factor (ξ) | RI at 850 | Δn | NA |
|---|---|---|---|---|
| 1.0261 | 0.9957 | 1.4673 | 0.0147 | 0.207 |
| 1.0268 | 0.9962 | 1.4526 |  |  |

Table 18.3

FIG. 18

F8DA – Fluorinated hexanediol diacrylate

PNGDA – Propoxylated neopentyl glycol diacrylate

TFPM – Tetrafluoropropyl methacrylate

IOA – Iso-octyl acrylate

EBDA10 – Ethoxylated (10) bisphenol A diacrylate

DEAP – Diethoxyacetophenone

D4265 – Darocur 4265 (mixture of Darocur TPO and 1173)

OPTICAL FIBER SWITCH INCLUDING AN INDEX MATCHING ELASTOMERIC SOLID LAYER AND RELATED METHODS

FIELD OF THE INVENTION

The present invention relates to the field of optical waveguides and optical fibers, and, more particularly, to optical fiber connectors, waveguide devices, and related methods.

BACKGROUND OF THE INVENTION

Optical fibers are commonly used in telecommunications for communicating data signals over both short and long distances. With respect to other communication mediums, such as metal wires, optical fibers are advantageous in that signals travel along them with less loss, and they are also less susceptible to electromagnetic interference. Optical fibers also enjoy very high bandwidth (i.e., data rates). Optical fibers may also be used for illumination, and may be wrapped in bundles and used to carry images, such as in fiber optic cameras. Optical fibers may also be used in other applications, such as sensors and lasers, for example.

One disadvantage of optical fibers, however, is that they are more difficult to couple together than wire conductors, as discontinuities at a connection point can lead to light reflection and losses that significantly degrade signal quality. One approach to joining optical fibers is the use of mechanical fusion splicers, which align and fuse two fiber ends together. While this provides a very low loss connection between the fibers, fusion couplers are typically very expensive, and thus not practical for many implementations. Fusion splicers form permanent connections and are less suitable for temporary splices or other connections that are to be made temporary or dynamic.

Another approach used in some optical interfaces is to apply an index-matched material, such as liquids or gels. While such materials may generally be formulated to match the index of refraction of an optical medium, problems may arise due to migration of the index-matched material and contamination in unwanted areas. Moreover, such materials are prone to attract dirt, and are typically difficult to clean once contaminated.

U.S. Pat. No. 5,778,127 to Gilliand et al. discloses an optical transceiver apparatus which has a housing including a diode package aligned with a lens, and having an optical filler composition injected therebetween. The optical filler composition comprises a silicone elastomer which may be used as an index matching element, as a positioning and locking means, or an optical attenuator. Other exemplary approaches for optical fiber connectors or terminations are set forth in the following references: U.S. Pat. No. 5,619,610 to King et al.; U.S. Pat. No. 5,515,465 to Olin et al.; U.S. Pat. No. 6,501,900 to Aloisio, Jr. et al.; U.S. Pat. No. 6,097,873 to Filas et al.; and U.S. Pat. No. 5,058,983 to Corke et al.

SUMMARY OF THE INVENTION

In view of the foregoing background, it is therefore an object of the present invention to provide an optical fiber switch and related methods providing enhanced optical interconnection.

This and other objects, features, and advantages are provided by an optical fiber switch which may include first and second angled optical fibers having respective first and second end faces. Each of the first and second angled optical fibers may include a core having a core index of refraction, and a cladding surrounding the core and having a cladding index of refraction different than the core index of refraction. The optical fiber switch may further include a first index matching elastomeric solid layer having a proximal face coupled to the first end face, and a distal face opposite the proximal face to be repeatably optically coupled to the second end face. The first index matching elastomeric solid layer may have an index of refraction matching at least the index of refraction of the core. The optical fiber switch may also include at least one actuator for relatively moving the first and second angled optical fibers between a coupled position and an uncoupled position. As such, the optical fiber switch thus provides a relatively durable optical fiber switch with desired optical coupling properties.

More particularly, the proximal end face may be chemically bound to the first end face, and the distal end face may be low-tack to be repeatably directly mechanically coupled to the second end face. Moreover, the low-tack distal face of the first index matching elastomeric solid layer may have surface properties defining a wetted interface devoid of air pockets with the second end face when pressed thereagainst. Additionally, the optical fiber switch may further include a second index matching elastomeric solid layer having a proximal end face chemically bound to the second end face, and a low-tack distal face opposite the proximal face to be repeatably optically and mechanically coupled to the low-tack distal face of the first index matching elastomeric solid layer.

The first angled optical fiber may include a first pair of transverse optical fiber ends joined together, and the second angled optical fiber may include a second pair of transverse optical fiber ends joined together. By way of example, the first index matching elastomeric solid layer may comprise an acrylate polymer. Furthermore, the first end face may have a canted angle from perpendicular to an axis of the first optical fiber, and the first index matching elastomeric solid layer may have a uniform thickness and match the canted angle.

In addition, the first index matching elastomeric solid layer may have a radially uniform index of refraction matching the core at a desired operating wavelength. Each of the first and second optical fibers may comprise glass, for example. Also by way of example, each of the first and second optical fibers may comprise a multimode optical fiber, and the at least one actuator may comprise at least one piezoelectric actuator.

A related method of making an optical fiber switch may include forming first and second angled optical fibers having respective first and second end faces. Each of the first and second angled optical fibers may include a core having a core index of refraction, and a cladding surrounding the core and having a cladding index of refraction different than the core index of refraction. The method may further include forming a first index matching elastomeric solid layer having a proximal face coupled to the first end face and a distal face opposite the proximal face to be repeatably optically coupled to the second end face, where the first index matching elastomeric solid layer has an index of refraction matching at least the index of refraction of the core or portion thereof. The method may also include positioning at least one actuator for relatively moving the first and second angled optical fibers between a coupled position and an uncoupled position.

BRIEF DESCRIPTION OF THE DRAWINGS

FIG. 18 is a series of tables which may be used to calculate a starting composition for an index matching elastomeric solid layer for use in interconnections and optical fiber switches in accordance with the invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1A:
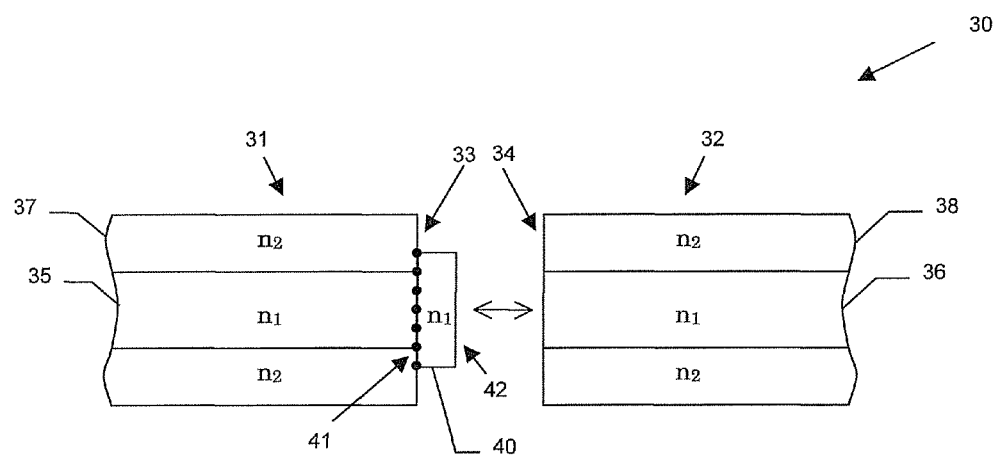
FIGS. 1A and 1B are schematic cross-sectional diagrams of a repeatable optical fiber interconnection (shown in coupled and uncoupled positions, respectively) including an index matching elastomeric solid layer providing core index of refraction matching in accordance with the invention.
Figure 1B:
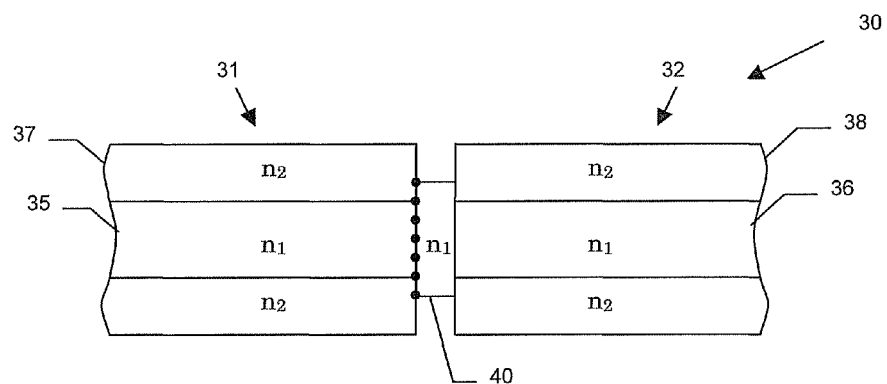

Referring initially to FIGS. 1A and 1B, a repeatable optical fiber interconnection 30 illustratively includes first and second optical fibers 31, 32 having respective first and second end faces 33, 34. Each of the first and second optical fibers 31, 32 illustratively includes a respective core 35, 36 (e.g., doped silica glass cores) having a core index of refraction $n_1$, and a respective cladding 37, 38 (e.g., plastic) surrounding the core and having a cladding index of refraction $n_2$ less than the core index of refraction. The repeatable optical fiber interconnection 30 further illustratively includes a first index matching elastomeric solid layer 40 having a proximal face 41 chemically bound to the first end face 33, as represented by the dots in the illustrated embodiment. The chemical bonding may be obtained by proper selection of the index matching material and/or various types of surface treatments to the end face 33, such as for example with silane compounds, as would be appreciated by those skilled in the art. Moreover, the first index matching elastomeric solid layer 40 also illustratively includes a low-tack distal face 42 opposite the proximal face 41 which may advantageously be repeatably optically coupled to the second end face 34 of the second optical fiber 32 as shown. The low-tack distal face can be obtained by proper selection of the index matching material (considering its post-cured properties) and/or the addition of a surface coating, as would also be appreciated by those skilled in the art. As used herein, a "low-tack" surface is one that allows the mated first and second optical fibers to be de-mated without causing permanent deformation of the surface of the index matching material and without the need for excessive force per unit area. By way of example, such force may be less than 10 g/mm$^2$ and, more particularly, less than 1 g/mm$^2$, when the material of the second mated object is fused silica.

The first index matching elastomeric solid layer 40 also advantageously has an index of refraction $n_1$ matching at least the index of refraction $n_1$ of the cores 35, 36. That is, the index of refraction of the first index matching elastomeric solid layer 40 is chosen to be substantially the same as that of the cores 35, 36 to be coupled together. This first index matching elastomeric solid layer 40 advantageously provides the optical function of an index matching liquid or gel, but without the above-noted disadvantages of such materials (e.g., less susceptible to contamination, etc). Further, by chemically bonding the first index matching elastomeric solid layer 40 to the first end face 41, the layer may thereby remain permanently in place while temporary connections are repeatedly made with the second mating end face 34.

As a result of its index matching, elastomeric solid properties, and chemical bonding to the first end face 33, the layer 40 advantageously provides reduced transmission loss and back reflection. Moreover, it also remains in place indefinitely, and does not migrate as do index matching gels and liquids. Additionally, the layer 40 may be more resistant to dirt and contaminants and may be cleaned, it retains an optically smooth surface, may be cast or formed into desired shapes, and it may be tailored to a wide range of refractive index values and elastic properties (e.g., modulus, flexibility, etc.), as will be appreciated by those skilled in the art. By way of example, the first index matching elastomeric solid layer 40 may comprise an acrylate polymer. Because acrylates may be patterned using lithography, for example, they provide the ability to form precise layer structures shaped and positioned with a relatively high degree of accuracy. Further details regarding exemplary elastomeric formulations that may be used for the layer 40 will be discussed further below.

In some embodiments, the low-tack distal end face 42 may be repeatably directly mechanically coupled to the second end face. For example, the low-tack distal face of the first index matching elastomeric solid layer may have surface properties defining a wetted interface devoid of air pockets with the second end face when pressed thereagainst, thereby providing in part a mechanical suction coupling with the second mating end face 34 of the second optical fiber 32, as will be appreciated by those skilled in the art.

In the illustrated embodiments, the optical fibers 31, 32 are multimode fibers. That is, the optical fibers 31, 32 may advantageously support many propagation paths or transverse modes, as opposed to single mode fibers which support a single mode or propagation path. Multimode fibers generally have a larger core diameter, and are used for short-distance communication links and for applications where high power transmission is required, such as in localized networks or between buildings. As such, since the addition or replacement of optical fibers may be more prevalent in localized areas where multimode fibers are used, the ability to repeatably optically (and, optionally, mechanically) couple multimode fibers may be a significant advantage. However, it will be appreciated by the skilled artisan that index matching elastomeric solid layers as described herein may also be used with single mode optical fibers, which are typically employed for relatively long communication links.

Figure 2A:
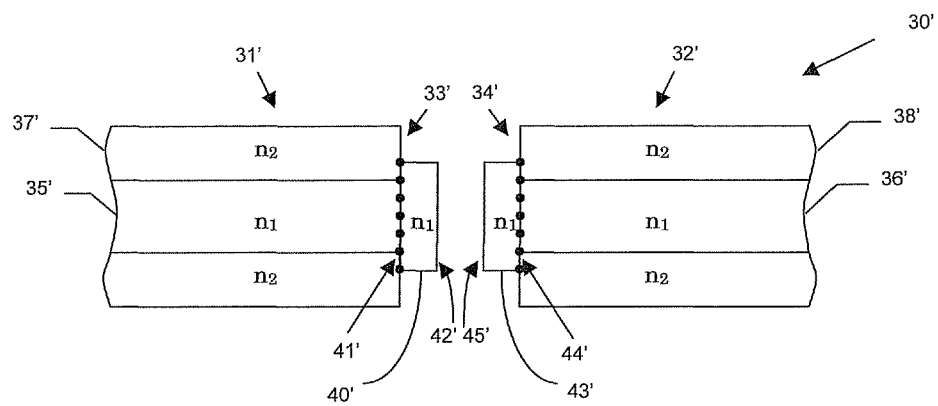
FIGS. 2A and 2B are schematic cross-sectional diagrams of an alternative embodiment of the repeatable optical fiber interconnection of FIGS. 1A and 1B including first and second index matching elastomeric solid layers.
Figure 2B:
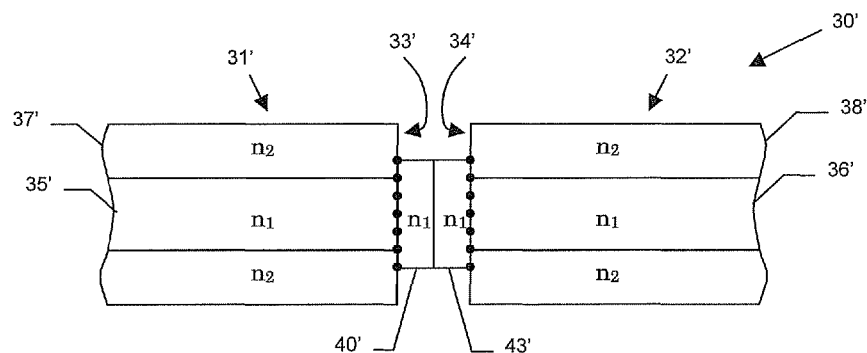

Referring now additionally to FIG. 2, an alternative embodiment of a repeatable optical fiber interconnection 30' illustratively includes a second index matching elastomeric solid layer 43'. The second layer 43' is similar to the first layer 40', in that it has a proximal end face 44' chemically bound to the second end face 34' of the second optical fiber 32', and a low-tack distal face 45' opposite the proximal end face to be repeatably optically and mechanically coupled to the low-tack distal face 42' of the first index matching elastomeric solid layer 40'.

Figure 3:
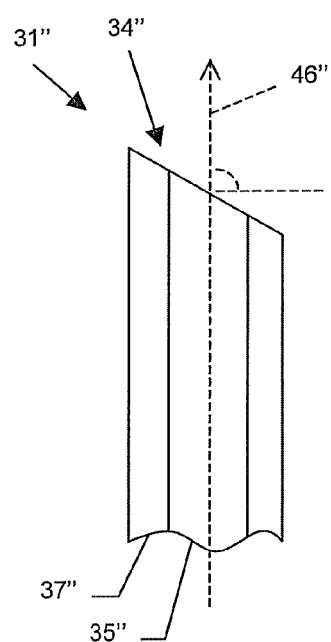
FIGS. 3 and 4 are schematic cross-sectional diagrams of an optical fiber having an angled end, shown with and without a corresponding index matching elastomeric solid layer, respectively, for use in an alternative embodiment of the interconnection of FIGS. 1A and 1B.
Figure 4:
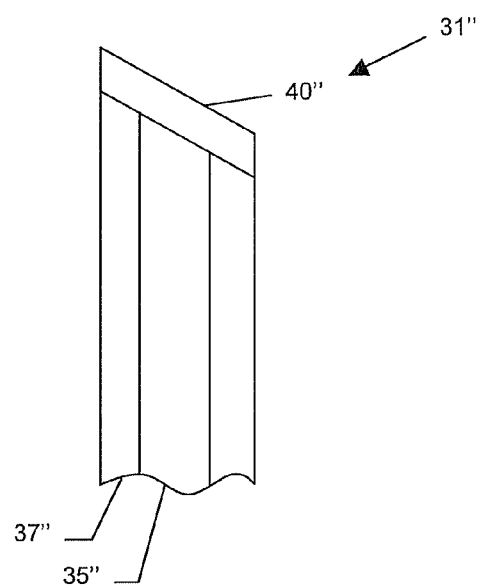

As shown in FIG. 3, in some embodiments the first end face 34" may have a canted angle from perpendicular to an axis 46" of the first optical fiber 31". In such embodiments, the first index matching elastomeric solid layer 40" may have a uniform thickness and match the canted angle, as shown in FIG. 4. As such, the interconnection may advantageously be used in applications where not only perpendicular optical fiber end faces are used, but also in applications where angled optical fiber ends faces require repeatable optical coupling, such as in optical switches, which will be discussed further below.

The layer 40" is tailored to form an extension of the optical fiber 31", and to conform to the angle of the end face of the fiber. A high degree of light transmission may advantageously be maintained between the two optical fibers 31", 32" as a result of the layer 40", whereas without this layer little or no light would be transmitted therebetween. Moreover, the elastomeric nature of the layer 40" advantageously allows small discontinuities in the mating faces to be uniformly filled, thus reducing the loss of light through reflection and scattering at the interface, as will be appreciated by those skilled in the art.

Figure 5A:
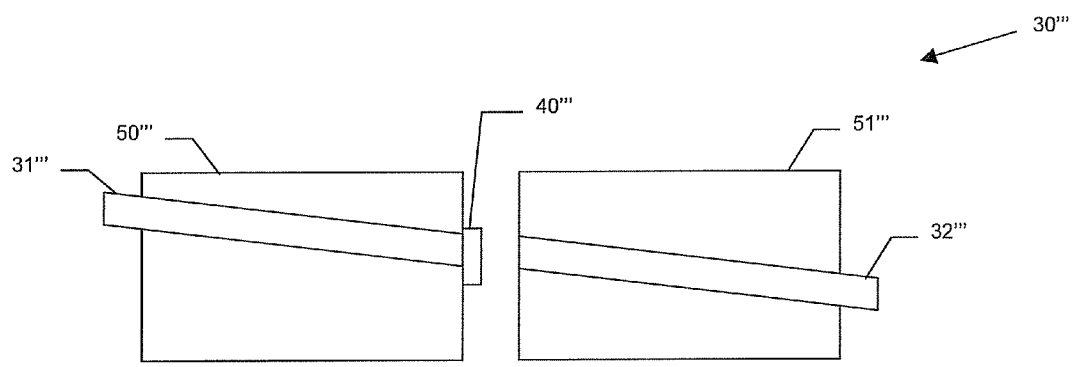
FIGS. 5A and 5B are schematic cross-sectional diagrams of an alternative embodiment of the repeatable optical fiber interconnection of FIGS. 1A and 1B including ferrule mounts for the optical fibers.
Figure 5B:
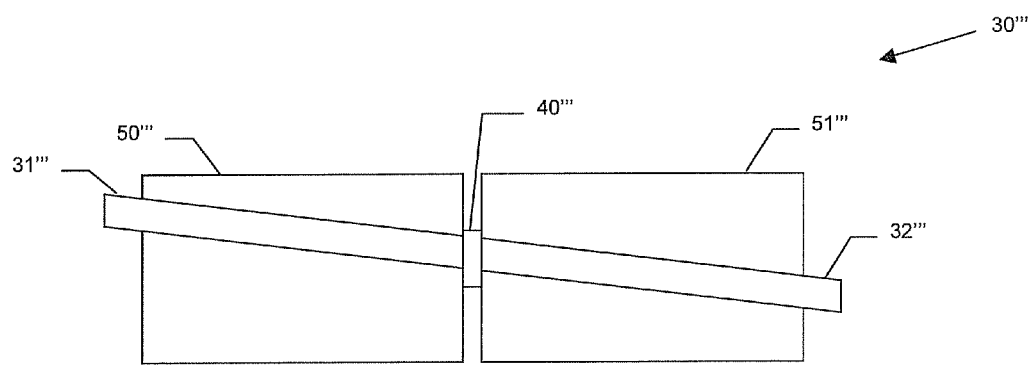

Yet another embodiment of the repeatable optical fiber interconnection 30''' is now described with reference to FIGS. 5A and 5B. In the illustrated example, a first ferrule mounting 50''' for the first optical fiber is provided, along with a second ferrule mounting 51''' for the second optical fiber. As will be appreciated by those skilled in the art, in fiber optic terminations, precision ferrules are sometimes desirable to assist with connecting two fibers together. The first and second fibers 31''' and 32''' are shown optically coupled together in FIG. 5B.

Figure 6:
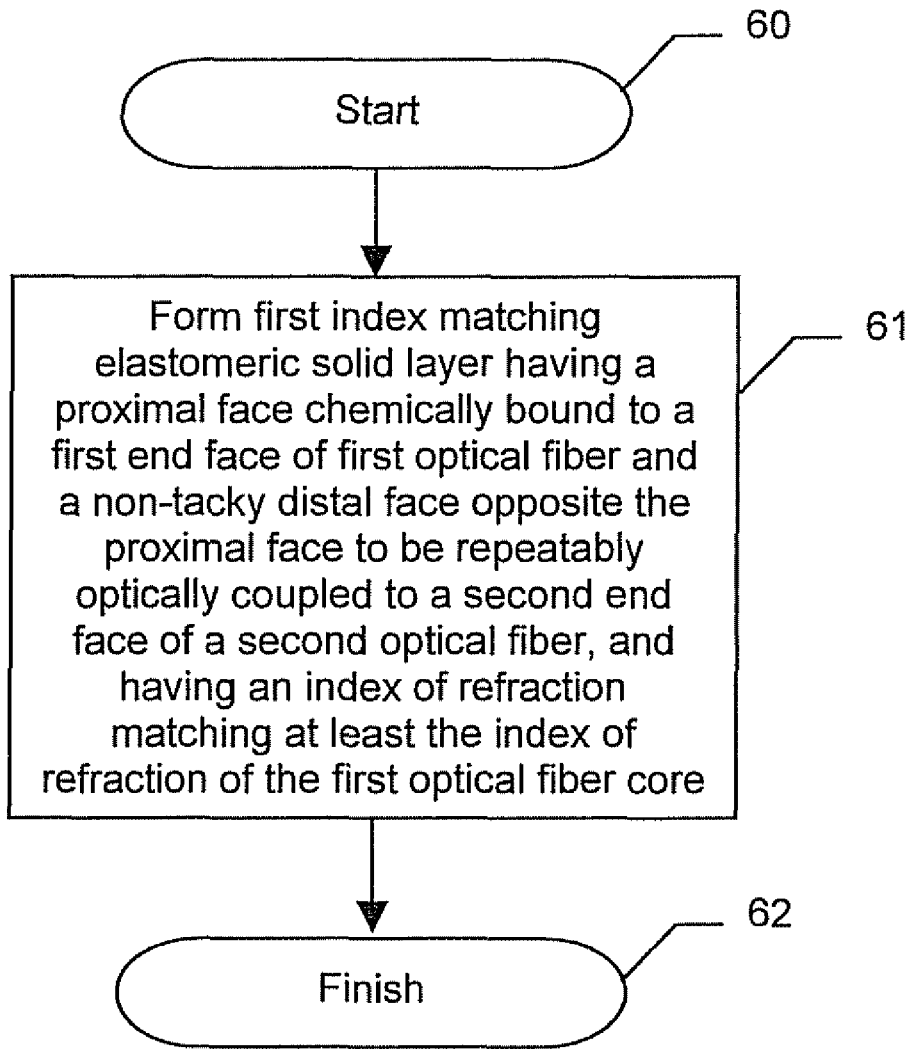
FIG. 6 is a flow diagram illustrating method aspects for making the interconnection of FIGS. 1A and 1B.

A related method of making a repeatable optical fiber interconnection between the first and second optical fibers 31, 32 is now described with reference to FIG. 6. Beginning at Block 60, the method illustratively includes forming a first index matching elastomeric solid layer 40 having a proximal face 41 chemically bound to the first end face 33 of the first optical fiber 31, and a low-tack distal face 42 opposite the proximal face, at Block 61. As noted above, the low-tack distal face 42 is to be repeatably optically coupled to the second end face 34 of the second optical fiber 32, thus concluding the illustrated method (Block 62).

Figure 7A:
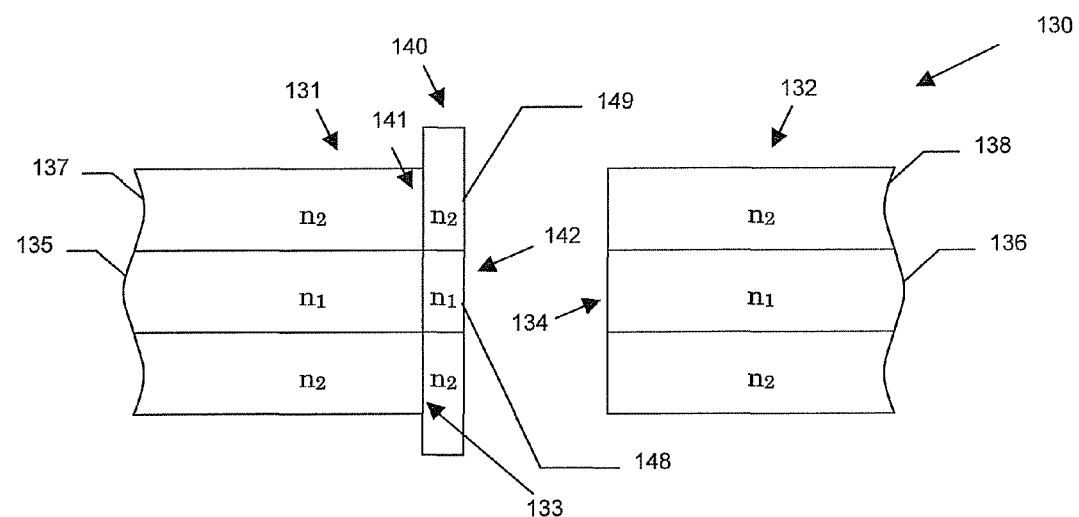
FIGS. 7A and 7B are schematic cross-sectional diagrams of a repeatable optical fiber interconnection (shown in coupled and uncoupled positions, respectively) including an index matching elastomeric solid layer providing core and cladding index of refraction matching in accordance with the invention.
Figure 7B:
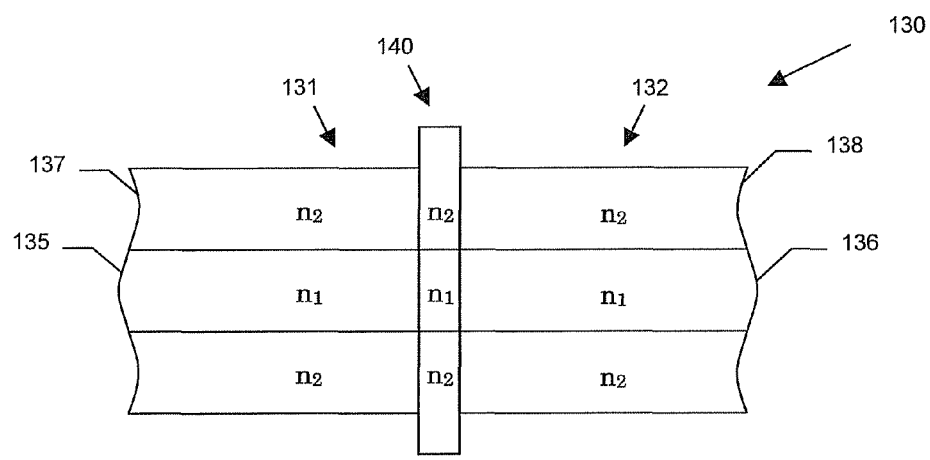
Figure 8:
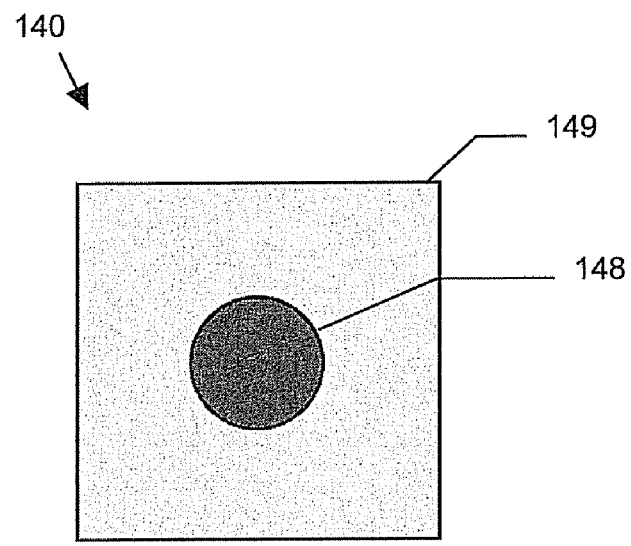
FIG. 8 is an end view of the index matching elastomeric solid layer of FIGS. 7A and 7B.

Turning now to FIGS. 7A, 7B, and 8, another embodiment of a repeatable optical fiber connection 130 illustratively includes an index matching elastomeric solid layer 140 having an index of refraction profile matching an index of refraction of the core 135 and the cladding 137. More particularly, the layer 140 illustratively includes a first portion 148 having an index of refraction $n_1$ matching the index of refraction of the core 135, and a second portion 149 having an index of refraction $n_2$ matching the index of refraction of the cladding 149. As with the above-described structure, the layer 140 is chemically bonded to the optical fiber 131. The layer 140 thereby provides a light guiding structure, i.e., an optical waveguide. That is, the layer 140 may advantageously be tailored to form an extension of the optical fiber 131, providing for the preservation of the propagating optical mode(s). Furthermore, the elastomeric nature of the layer 140 allows small discontinuities in the mating faces 131, 132 to be uniformly filled, thereby preventing the loss of light through reflection and scattering at the interface. The mode matched guiding structure thus advantageously provides for reduced loss and back reflection.

Figure 9:
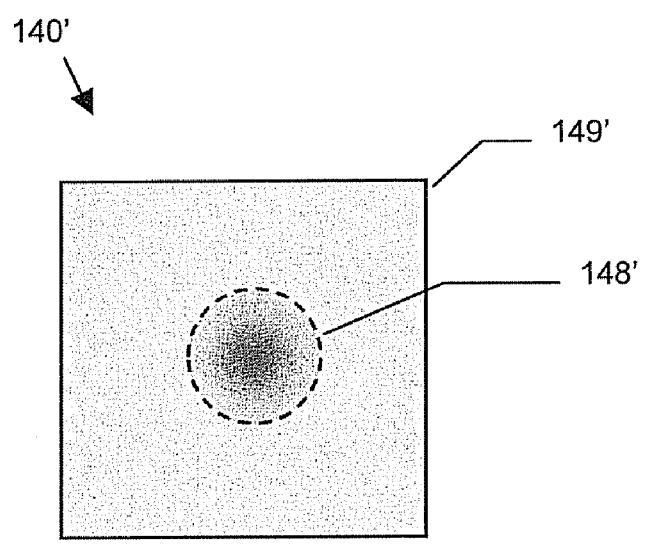
FIG. 9 is an end view of an alternative embodiment of the index matching elastomeric solid layer of FIG. 8 having a graded index of refraction.

As also noted above, acrylates and copolymers with urethanes and thiolenes are advantageous materials for forming the layer 140, as they may provide desired optical matching and may be precisely patterned using techniques, such as lithography or molding, with a relatively high degree of accuracy. Moreover, these materials may advantageously be used to create different index profiles for the first portion 148. More particularly, an alternative embodiment of the layer 140' is shown in FIG. 9, in which the first portion 148' has a graded index of refraction, as opposed to the first portion 148 of FIG. 8 which has radially uniform index of refraction matching the core 135' at a desired operating wavelength, as will be appreciated by those skilled in the art. The graded portion 148' may be particularly useful in GRIN lens applications, as will be discussed further below.

Figure 10:
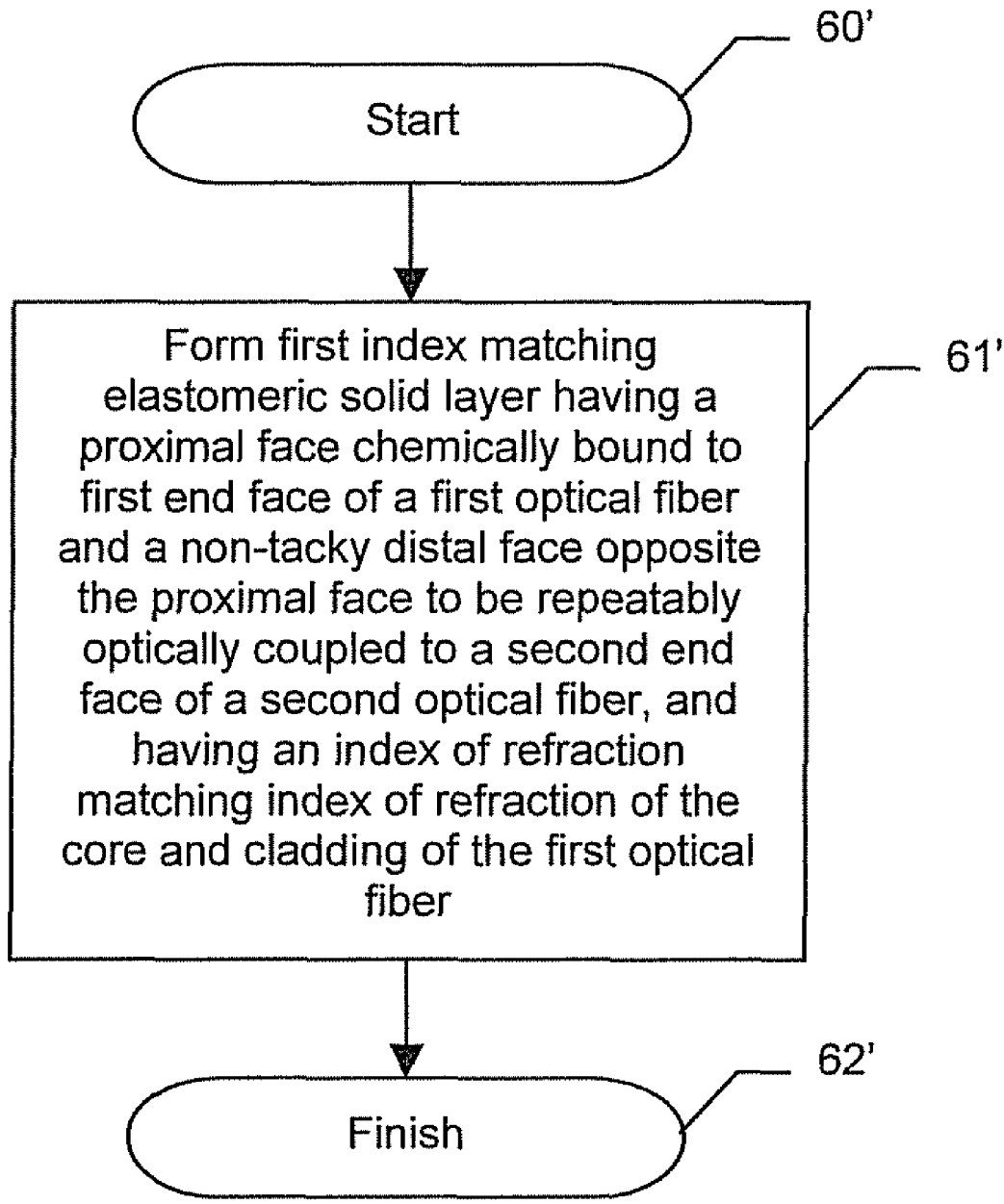
FIG. 10 is a flow diagram illustrating method aspects for making the interconnection of FIGS. 7A and 7B.

Another method of making a repeatable optical fiber interconnection between the first and second optical fibers 131, 132 is now described with reference to FIG. 10. Beginning at Block 60', the method illustratively includes forming a first index matching elastomeric solid layer 140 having a proximal face 141 chemically bound to the first end face 133 of the first optical fiber 131, and a low-tack distal face 142 opposite the proximal face, at Block 61'. As noted above, the low-tack distal face 142 is to be repeatably optically coupled to the second end face 134 of the second optical fiber 132, thus concluding the illustrated method (Block 62').

Figure 11:
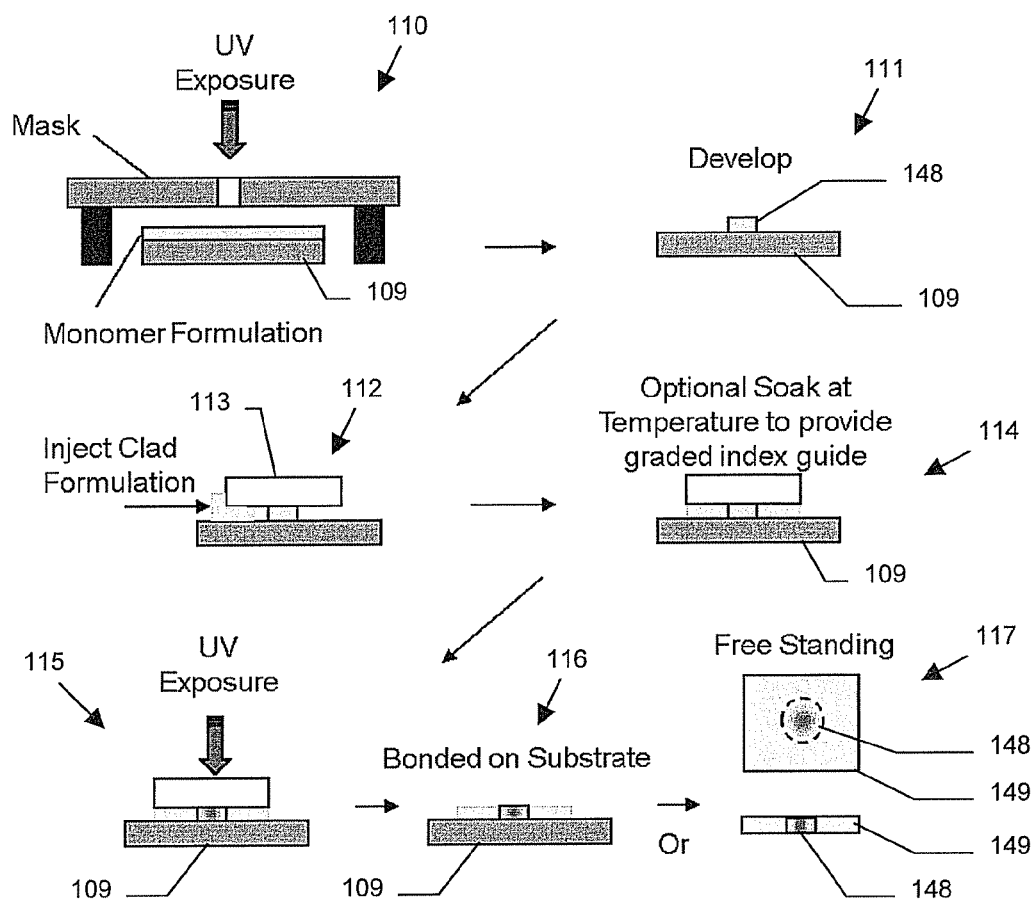
FIG. 11 is a series of schematic diagrams illustrating a method for making the index matching elastomeric solid layer of FIG. 8.

An exemplary approach for forming the layer 140 with the first and second portions 148, 149 will now be discussed with reference to FIG. 11. Forming the first portion 148 of the layer 140 initially involves a patterned exposure of the core material, which may advantageously be accomplished with a proximity exposure through a glass mask, after spinning the core formulation on a substrate 109, such as a silicon substrate, for example, at step 110. In some embodiments, the core formulation may be formed directly on the end of the optical fiber 131 rather than the substrate 109. A contact exposure may be employed in which the liquid monomer fills the region between the mask and the substrate 109. The first portion 140 may then be patterned and developed, at step 111, followed by injection of a cladding formula at step 112. The cladding may be restricted to form only on the sides of the core by using a cover plate 113 as illustrated, and allowing osmotic forces to fill the space between substrate and the glass cover plate 113 with cladding monomer.

If a graded index is desired, the core or first portion 148 may be partially cured to a level sufficient to define the core, and the liquid cladding formulation may be allowed to exchange monomers with the core by allowing the assembly to soak at some elevated temperature (e.g., 40 to 60° C., although other temperatures may be used in different embodiments), at step 114. The degree of grading will depend on time, temperature, and the percentage of cure in the patterned core, as will be appreciated by those skilled in the art. In general, for a graded index guide it is desirable that the monomers in each formulation include two or more monomers that have relatively widely spaced refractive indexes and differing rates of cure, allowing monomers that have different refractive indexes to be readily diffused into and/or out of the core region, as will also be appreciated by those skilled in the art.

If a thermal soak is not being used to provide a graded index, the injected clad formulation may simply be allowed to stand at room temperature for a sufficient amount of time to allow the cladding portion 149 to spread around the core portion 148. A second UV exposure may be performed at step 115, after which the layer 140 may remain bonded on the substrate for packaging or handling, at step 116, or removed from the substrate 116 to provide a free standing layer to be coupled to the optical fiber 131, at step 117. In accordance with one exemplary implementation, the layer 140 may be peeled from the substrate 109 while still attached to the glass cover plate 113. A mask size of 62.5 microns in diameter was used in one exemplary implementation, and this diameter was essentially reproduced in the size of the core. Deviations in the diameter may advantageously be produced by under or over exposure or by under development, if desired, as will be appreciated by those skilled in the art.

Figure 12:
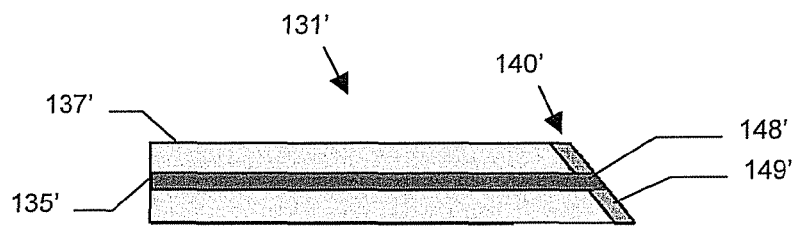
FIG. 12 is a schematic cross-sectional diagram of an optical fiber having and angled end and a corresponding index matching elastomeric solid layer for use in an alternative embodiment of the interconnection of FIGS. 7A and 7B.
Figure 13:
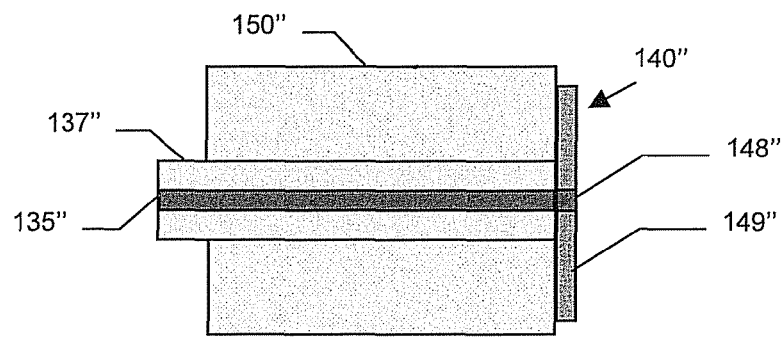
FIG. 13 is a schematic cross-sectional diagram of an optical fiber and corresponding ferrule mount for use in an alternative embodiment of the interconnection of FIGS. 7A and 7B.
Figure 14:
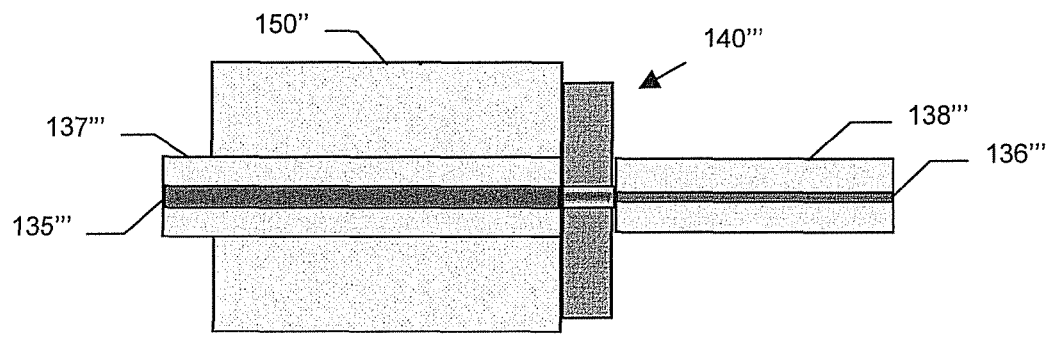
FIG. 14 is a schematic cross-sectional diagram of an alternative embodiment of the interconnection of FIGS. 7A and 7B in which the first and second optical fibers have different core sizes, and the index matching elastomeric solid layer has a graded core portion to thereby provide a GRIN lens interconnection structure.

Additional configurations that may be produced using variations of the above-described approach are illustrated in FIGS. 12-14. An optical fiber 131' with a canted end face, and corresponding index matching elastomeric solid layer 140' with a uniform thickness and matching the canted angle of canted end face, is shown in FIG. 12. Similar to the embodiment illustrated in FIGS. 5A and 5B, another exemplary embodiment with a ferrule mounting 150' and an index matching elastomeric solid layer 140" with first (core matching) and second (cladding matching) portions 148", 149" may also be provided, as seen in FIG. 13. In the embodiment illustrated in FIG. 14, the index matching elastomeric solid layer 140' includes a first (core) portion 148''' with a graded index of refraction, in which the layer is positioned between first and second optical fibers 131''', 132''' to thereby provide an integral GRIN lens mounted on a ferrule 150''', as will be appreciated by those skilled in the art.

Figures 15A, 15B:
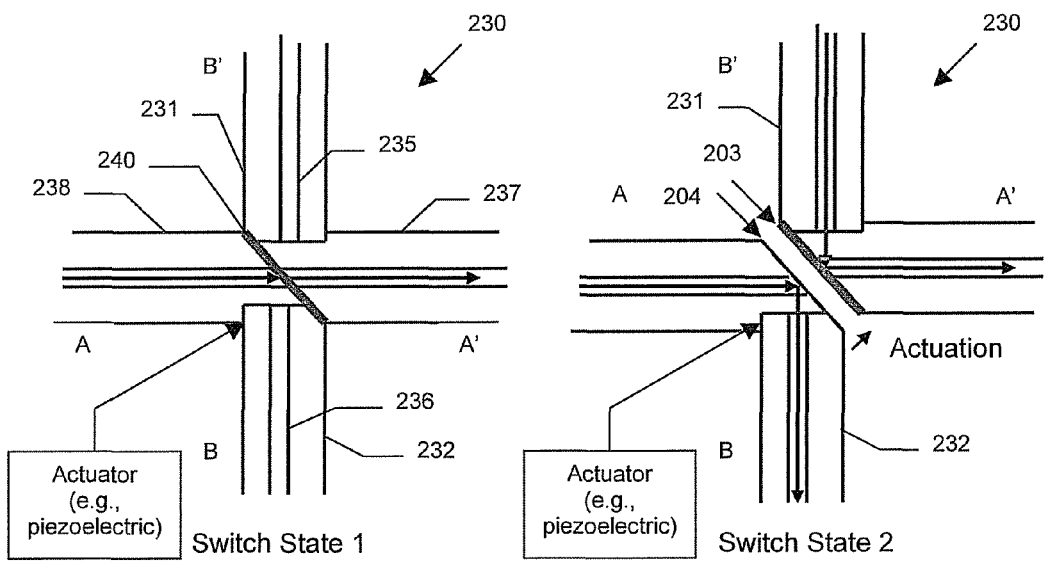
FIGS. 15A and 15B are schematic cross-sectional diagrams of an optical fiber switch (shown in coupled and uncoupled positions, respectively) including an index matching elastomeric solid layer in accordance with the invention.

Referring now to FIGS. 15A and 15B, an exemplary optical fiber switch 230 including an index matching elastomeric solid layer 240 illustratively includes first and second angled optical fibers 201, 202, which may be multimode or single mode fibers. More particularly, the switch 230 is shown in a coupled or closed position (switch state 1) in FIG. 15A, and an uncoupled or open position (switch state 2) in FIG. 15B. In the coupled position, light is transmitted along the path A-A' (i.e., between the two cores 235 and 237), and in the uncoupled position along the path A-B (i.e., within the first optical fiber 231) and/or the path B'-A' (i.e., within the second optical fiber 232).

Each of the first and second angled optical fibers 201, 202, illustratively includes respective first and second end faces 203, 204. As with the above-described embodiments, an index matching elastomeric solid layer 240 is included and has a proximal face coupled to the first end face 203, and a distal face opposite the proximal face to be repeatably optically coupled to the second end face 204. Here again, the index matching elastomeric solid layer 240 has an index of refraction matching the index of refraction of the core, as shown in FIGS. 1A and 1B. The optical fiber switch 200 may also include one or more actuators 255 (e.g., a piezoelectric actuator(s)) for relatively moving the first and second angled optical fibers 231, 232 between the coupled and uncoupled positions, as will be appreciated by those skilled in the art.

Figure 16:
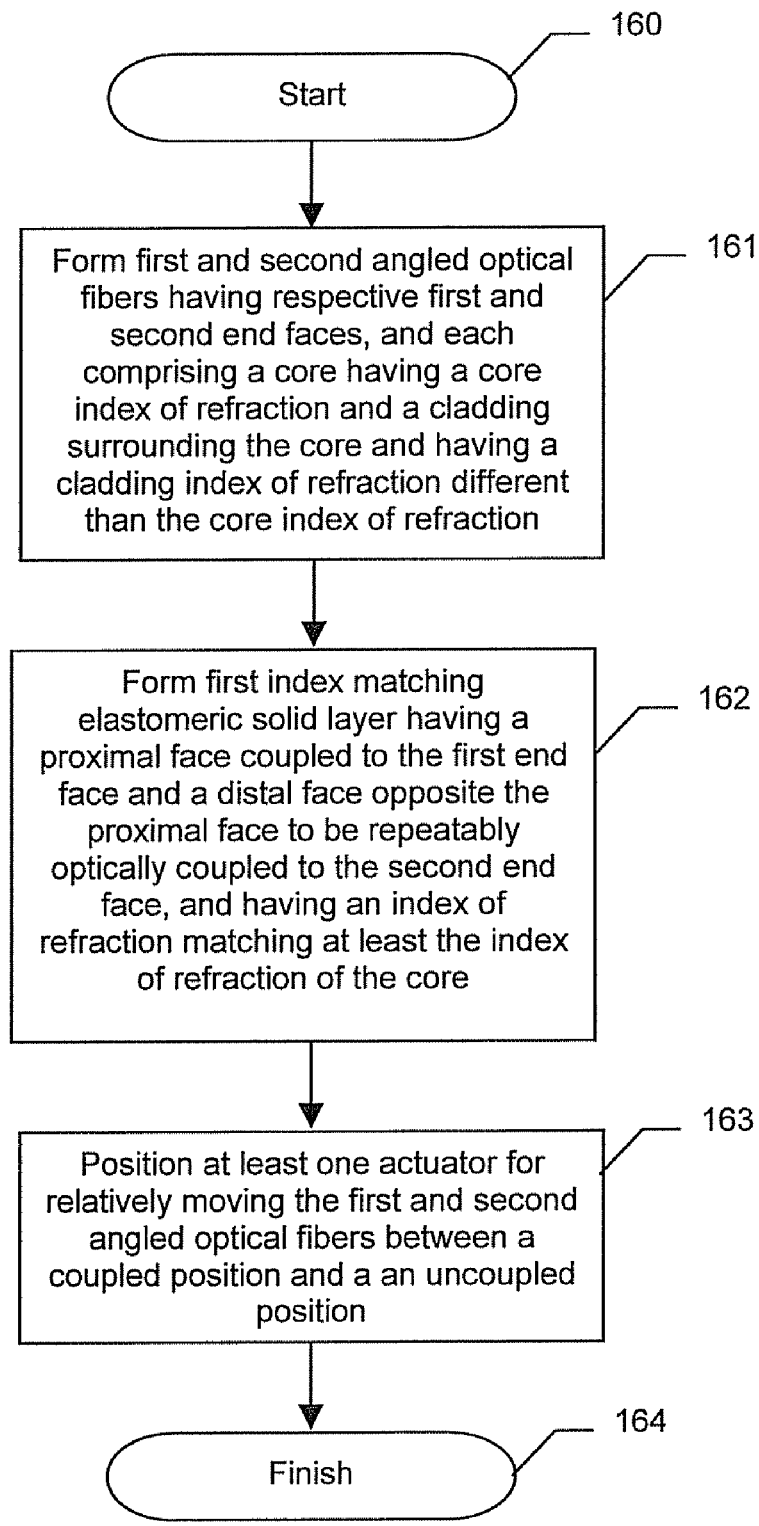
FIG. 16 is a flow diagram illustrating a method for making the optical fiber switch of FIGS. 15A and 15B.

A related method for making the optical fiber switch 230 is illustrated in FIG. 16. Beginning at Block 160, the first and second angled optical fibers 231, 232 are formed, each having respective first and second end faces (Block 161). As noted above, each of the first and second angled optical fibers 231, 232 illustratively includes a core 235, 237 having a core index of refraction $n_1$, and a cladding 236, 238 surrounding the core and having a cladding index of refraction $n_2$ different than the core index of refraction. The method further illustratively includes forming an index matching elastomeric solid layer 140 having a proximal face coupled to the first end face 203, and a distal face opposite the proximal face to be repeatably optically coupled to the second end face 204, at Block 162. Here again, the index matching elastomeric solid layer 204 has an index of refraction matching at least the index of refraction $n_1$ of the core 235. The method also illustratively includes positioning one or more actuators 255 for relatively moving the first and second angled optical fibers 231, 232 between the coupled position (FIG. 15A) and the uncoupled position (FIG. 15B), at Block 163, thus concluding the illustrated method (Block 164).

Figure 17:
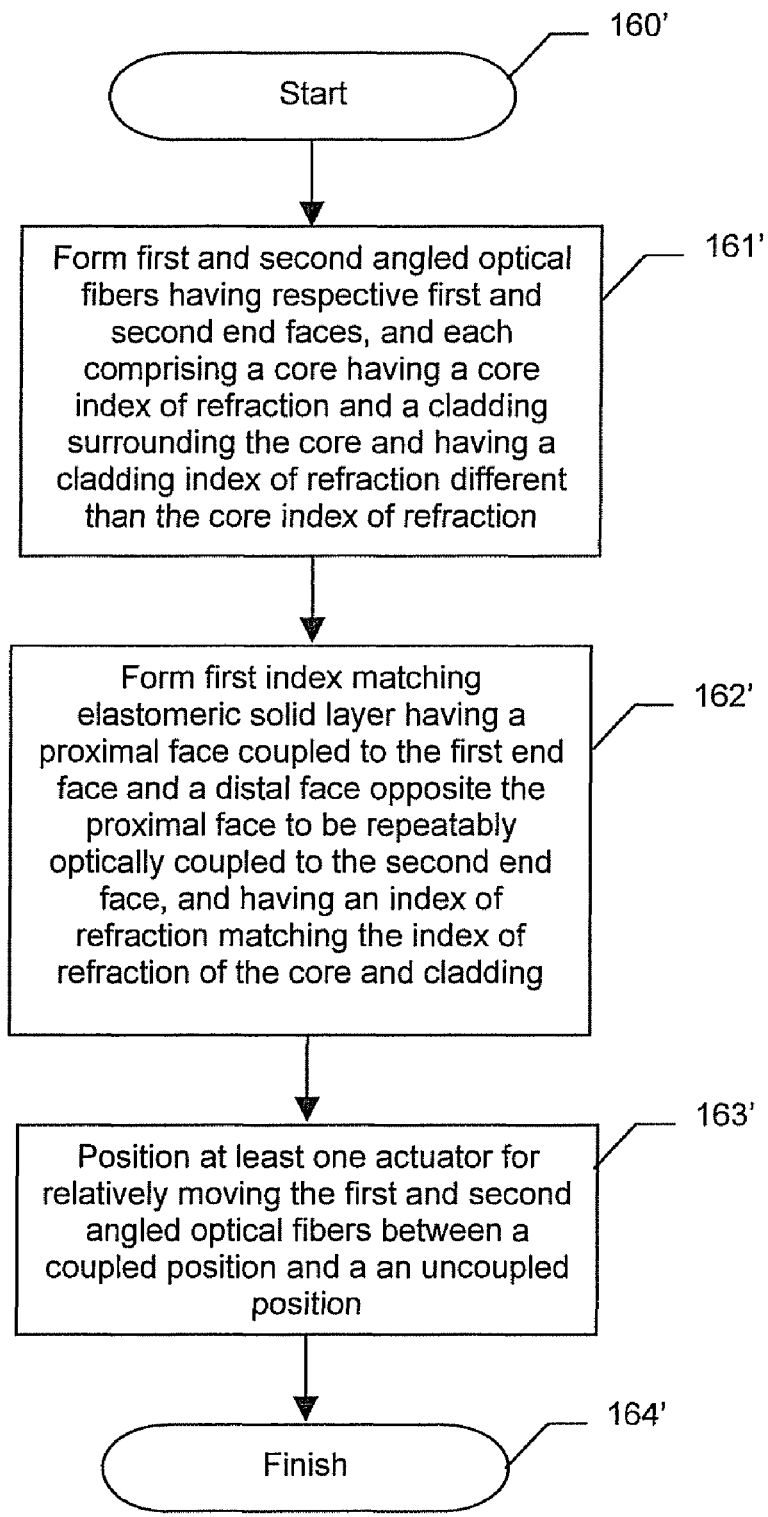
FIG. 17 is a flow diagram illustrating a method for making an alternative embodiment of the optical fiber switch of FIGS. 15A and 15B including an index matching elastomeric solid layer providing core and cladding index of refraction matching.

In some embodiments, the optical switch may include an index matching elastomeric solid layer matching both the core and the cladding, as discussed above with reference to FIGS. 7A and 7B. A related method for making such an optical switch is illustrated in FIG. 17, in which the index matching elastomeric solid layer is formed to have an index of refraction matching the core and cladding indexes of refraction, at Block 162'. It should also be noted that in some optical fiber switch embodiments, a second index matching elastomeric solid layer may be chemically bonded to the second face 204 of the second optical fiber 232, as similarly discussed above with reference to FIGS. 2A and 2B, as will be appreciated by those skilled in the art.

Generally speaking, desirable characteristics of a multimode switch include achieving stringent requirements of low insertion loss, low return loss, and fast switching time. However, such characteristics are generally difficult to achieve in a multimode switch. Typically, multimode switches are of a mechanical type utilizing moving fibers or moving optical elements (e.g. mirrors). Achieving the fast switching time requires micro-electromechanical systems (MEMS) scale components to reduce the moving mass. Designs that reduce the extent of the required motion also are desirable. Moreover, precise alignment of the switch in the coupled switch state, angling of the waveguide faces, and/or careful index matching within the interface between guides are also typically desirable. Reduction of any unguided light paths is also a significant consideration.

These characteristics may advantageously be achieved with the switch 200, which operates on the principle of frustrated total internal reflection (FTIR). The switch 200 requires only a short degree of motion between the first and second end faces 203, 204. Generally, the required displacement need be only about 3 wavelengths (e.g., 4 microns) or less to operate the switch 200. The switch may be designed with a 45-degree or greater angle ($\alpha$) interface, so that back reflection in state 1 (coupled position) will be strongly suppressed. As noted above, the switch 200 may accomplish either of two switch states, namely (1) A to A' (i.e., coupled) and (2) A to B and/or B' to A' (uncoupled). The switch 200 may be built as a half 2×2 crossbar switch, or it may be assembled from two 1×2 switches, as will be appreciated by those skilled in the art.

Exemplary optical fiber switch implementations will now be described with reference to FIGS. 18-24. In the following examples, the index matching elastomeric solid layer is referred to as an elastomeric index matching medium (EIMM). In the case where EIMM is constructed as a light guide, it may have a core oriented at a 45-degree or greater angle to the plane of the film, and sized to match the core of the fiber (e.g., 50 or 62.5 µm). As shown in FIGS. 15A and 15B, the core is aligned with the fiber to which the EIMM is mounted.

In those embodiments where the core region 148 of the EIMM may also be graded in index, light is advantageously allowed to propagate through the SIMM just as it does through the fiber itself. This provides for reduced loss, and allows the SIMM to be of different thicknesses as needed to satisfy the mechanical aspects of the given design. In state 2 (i.e., uncoupled), a significant portion of the light will be reflected at the interface between the EIMM and air. As will be appreciated by those skilled in the art, variations of the basic design shown in FIGS. 15A and 15B are possible. Some potential variations would include the use of stationary mirrors or lenses to collect or insert the light in paths B and B', for example. Moreover, other types of actuators may also be used.

Various SIMM polymer formulations may be used for the repeatable optical fiber interconnection and optical fiber switches discussed above. Generally speaking, the SIMM polymers may be formed through UV curing of acrylates and/or methacrylates. Fabrication of the polymer may begin with a formulation of liquid acrylate and/or methacrylate (abbreviated herein as(meth)acrylate) monomers with a small amount of a photoinitiator and an antioxidant. The index of refraction of the monomers at 589.3 nm (sodium D line) is provided by the manufacturer. For optical fiber applications, the index of the polymer at 1310 nm and/or at 850 nm is of particular interest. Polymers made with different monomer formulations will have both a different index and a different dispersion, as will be appreciated by those of skill in the art.

An initial estimate may be used to determine the refractive index as a function of the relative amounts of the monomers in the starting formulation. This estimated formulation may be used as a starting point, and then small additions of specific monomers may be used based upon actual measurements to refine the targeted refractive index formulation for the desired polymer. FIG. 18 provides an exemplary set of tables which may be used to calculate the starting composition of a liquid monomer formulation. Since the photoinitiator and the antioxidant represent a small fraction of the total volume, they are ignored in the calculation.

Table 18.1 provides input values describing the characteristics of the liquid monomers and the volume percentages of each monomer that are targeted for use. The empirical parameters in the first two columns of Table 18.3 give a measure of expected change to be incurred as a result of polymerization ($\delta$), and the expected shift in the index in going from 589 nm to 1310 or 850 nm as a result of dispersion ($\xi$) $\delta$ is estimated by the ratio of index at 589.3 nm between the liquid monomer and the cured polymer. The dispersion factor, $\xi$ the ratio of the index of the polymer at the target wavelength (850 or 1310 nm) and the index at 589.3 nm. These parameters are obtained from measurements on closely related acrylate polymers. The calculated values are highlighted in the last three columns of Table 18.3. In the illustrated example, the NA of Corning InfiniCor SX 50-µm fiber is 0.200, so the volume percentages of the various monomers are adjusted to reach this value. The calculation of the expected refractive index is made with Eq. (1) below, where $Vf_i$ represents the volume fraction of the $i^{th}$ component, $\delta$ is the polymerization factor, and $\xi$ is the dispersion factor at 1310 or 850 nm:

$$n_{polymer}=(n_A{*}Vf_A+n_B{*}Vf_B+n_C{*}Vf_C+n_D{*}Vf_D+n_E{*}Vf_E){*}\delta{*}\xi. \quad (1)$$

Exemplary switches were designed around two graded-index fiber types: InfiniCor SX (50 µm) and Corning InfiniCor CL-1000 (62.5 µm) from Corning, Inc., of Corning, N.Y. Systems operating at 850 nm would tend to use InfiniCor SX, while those operating around 1310 nm would tend to use InfiniCor CL-1000, although either fiber type may be used within either wavelength region. Since the EIMM is designed to provide index matching, it is significant to characterize the index of refraction of the respective fibers at the wavelengths of interest, and a summary thereof is provided in the following table of measured and specified parameters for Infinicor fibers.

| Fiber Type | Wavelength (nm) | Peak Core Index | Clad Index | $\Delta$n | $\Delta$ | $\Delta$ from Spec | Peak NA | NA from Spec |
|---|---|---|---|---|---|---|---|---|
| InfiniCor SX | 850 | 1.46735 | 1.4525 | 0.01485 | 1.01% | 1.00% | 0.208 | 0.200 |
| InfiniCor CL 1000 | 1322 | 1.4753 | 1.4467 | 0.0286 | 1.92% | 2.00% | 0.289 | 0.275 |

As discussed above, the elastomeric index matching medium may be a (meth)acrylate polymer that is synthesized from acrylate and methacrylate monomers by UV curing. Monomers are selected on the basis of a variety of criteria covering the desired properties of the polymer, such as refractive index, hardness, modulus, toughness, and clarity, as will be appreciated by those skilled in the art. Monomers having lower health risks or toxicity may also be favored. Polymers of low to moderate hardness are also generally desirable, so that effective wetting of the optical contact surface may be readily achieved when the switch is in the closed or coupled (A-to-A') position. The modulus will determine the force necessary to achieve a wetted spot covering the entire core (and optionally cladding) region of the fiber.

Figure 19:
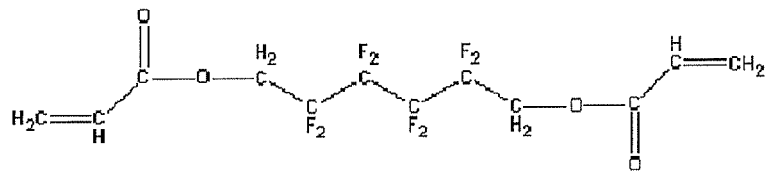
FIG. 19 is a series chemical formulas for exemplary acrylate monomers that may be used for forming an index matching elastomeric solid layer for use in interconnections and optical fiber switches in accordance with the invention.
Figure 19:
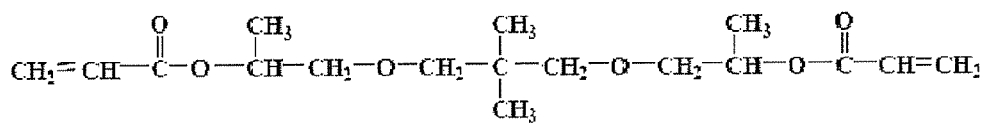
Figure 19:
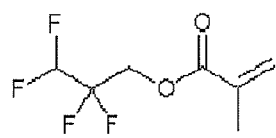
Figure 19:
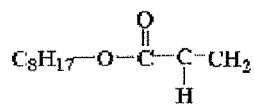
Figure 19:
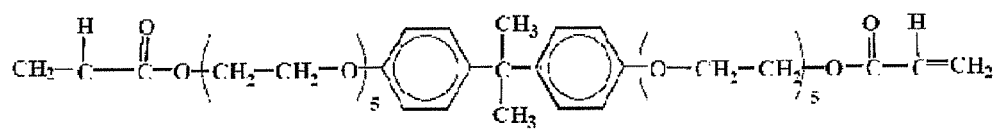

One exemplary selection of acrylate monomers is shown in FIG. 19. Each monomer contributes unique attributes. The fluorinated compounds, F8DA and TFPM, are used to lower refractive index of the formulation to match the refractive index of the fiber core and cladding. The aromatic compound, EBDA-10, contributes a higher index to the core via the presence of phenyl groups. By virtue of its long pendant chains of ethoxy groups, it also imparts flexibility, toughness and reduces hardness. The aliphatic diacrylate, PNGDA, also has intermediate refractive index with desired mechanical flexibility, and in combination with F8DA or EBDA-10, allows the index of the cladding and/or the core to be adjusted up or down. The monofunctional monomers, TFPM, IBA and IOA, allow the crosslink density to be adjusted, which influences hardness and toughness. These monomers may also be used to adjust the glass transition temperature (Tg) of the polymer up or down, since the homopolymer of IBA has a relatively high Tg (90° C.) and that of IOA has a relatively low Tg (−54° C.). Generally speaking, a combination of these or other suitable monomers may be used which are miscible and not subject to phase separation upon polymerization. The following table provides a listing of the physical characteristics of several exemplary monomers:

| Material | MW | Viscosity (cp) | Density (kg/L) | Tg of Homopolymer (° C.) | RI of Liq. @ 589 nm | Surface Tension (dyn/cm) | Est. Liq. Loss @1310 dB/cm |
|---|---|---|---|---|---|---|---|
| EBDA-10 | 776 | 610 | 1.126 | 2 | 1.5142 | 37.6 | 0.20 |
| EBDM-30 | 2156 | 610 | 1.122 | −43 | 1.4906 | 43.8 | 0.17 |
| PNGDA | 328 | 15 | 1.005 | 32 | 1.4500 | 32.0 | 0.20 |
| IOA | 184 | 5 | 0.88 | −54 | 1.4346 | 28.0 | 0.22 |
| F8DA | 370 | 0.46 | 1.383 |  | 1.3937 | 24.2 | 0.09 |
| TFPM | 200 |  | 1.215 | 68 | 1.3730 | 20.6 | 0.11 |

The above-noted monomers include both monofunctional and difunctional monomers, that is, they contain either one or two (meth)acrylate groups. These groups are subject to a free-radical polymerization mechanism that leads to a heavily crosslinked solid that has elastomeric properties. To initiate polymerization with UV light, a UV-sensitive photoinitiator is included in the formulation. Also, to reduce the tendency to yellow with age, an antioxidant is added. Each of these components is present only as a small percentage of the formulation, e.g., at a 2% or lower level. As already noted, one desirable aspect of the formulation is that constituent components are miscible, and remain so as polymerization occurs. Phase separation may lead to haze formation, and thus optical scattering loss. Exemplary formulations are listed in the table below:

| Elastomeric Index Matching Material Formulations | | | | | |
|---|---|---|---|---|---|
|  | Abbreviation | EIMM 200 Core Formulation (weight %) | EIMM 200 Clad Formulation (weight %) | EIMM 401 Core Formulation (weight %) | EIMM 401 Clad Formulation (weight %) |
| Materials | | | | | |
| Isooctyl acrylate | IOA |  | 28.3% |  |  |
| Perfluorohexanediol diacrylate | F8DA | 79.0% | 26.4% | 26.6% | 35.1% |
| Propoxylated neopentyl glycol diacrylate | PNGDA | 21.0% | 26.0% | 21.3% | 15.6% |
| Tetrafluoropropyl methacrylate | TFPM |  | 19.3% | 25.6% | 32.8% |
| Ethoxylated (10) bisphenol A diacrylate | EBDA-10 |  |  | 26.6% | 16.6% |

-continued

| Elastomeric Index Matching Material Formulations | | | | | |
|---|---|---|---|---|---|
| | Abbreviation | EIMM 200 Core Formulation (weight %) | EIMM 200 Clad Formulation (weight %) | EIMM 401 Core Formulation (weight %) | EIMM 401 Clad Formulation (weight %) |
| Additives[1] | | | | | |
| Diethoxyacetophenone (Photoinitiator) | DEAP | 2.0% | 2.0% | | |
| Daracur 4265 (Photoinitiator) | D-4265 | | | 2.0% | 2.0% |
| Irganox 1010 (Antioxidant) | I-1010 | 0.3% | 0.3% | 0.3% | 0.3% |

Additives taken as a percent of the total of the materials list

Figure 20:
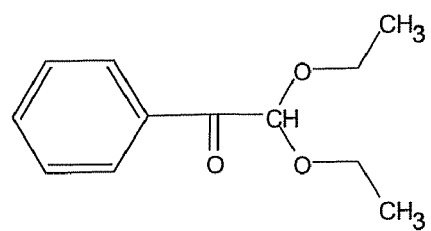
FIGS. 20 and 21 are chemical formulas for exemplary photoinitiators that may be included in the index matching elastomeric solid material formulation for use in interconnections and optical fiber switches in accordance with the invention.
Figure 21:
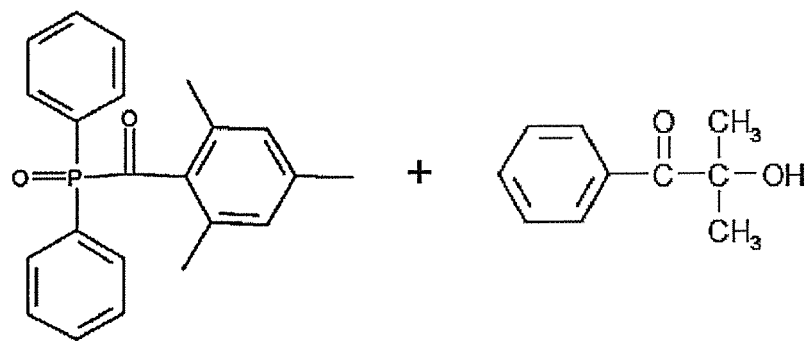
Figure 22:
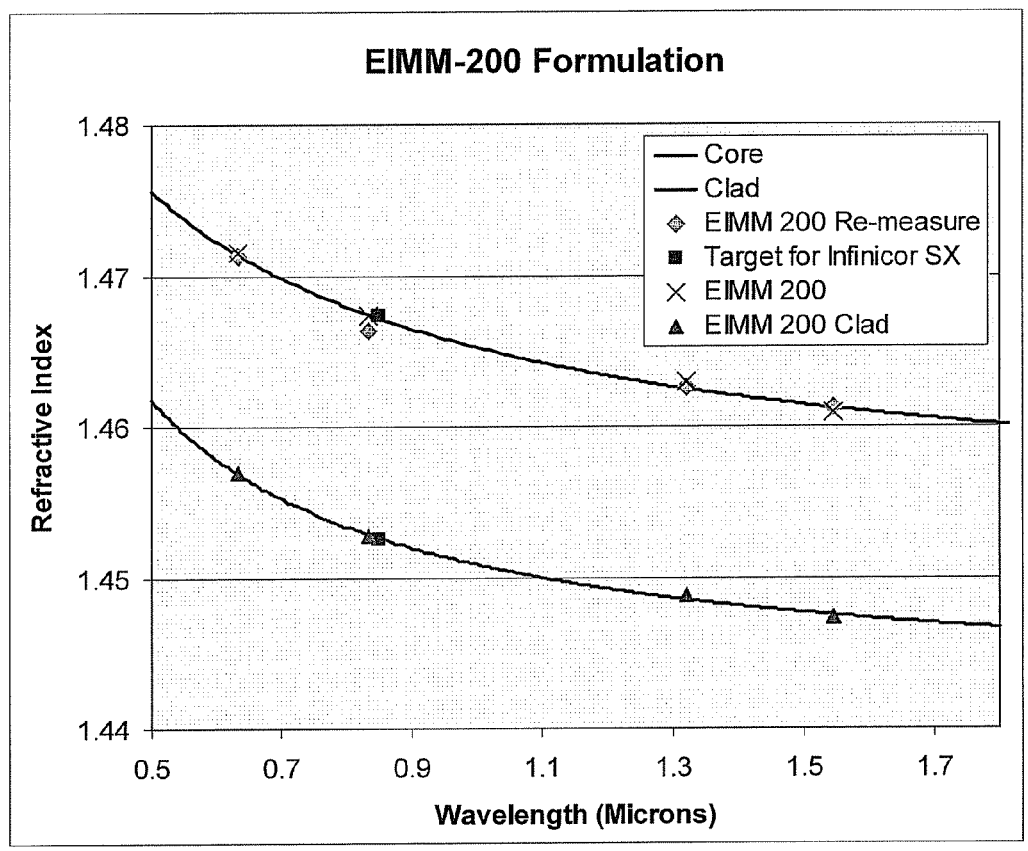
FIG. 22 is a graph of measured dispersion of refractive index for index matching elastomeric solid core and cladding materials for use in interconnections and optical fiber switches in accordance with the invention.

By way of example, Irganox 1010 from Ciba of Basel, Switzerland may be used as a suitable antioxidant. Moreover, two suitable liquid photoinitiators are shown in FIGS. 20 and 21. Both of the illustrated photoinitiators have a desirable response to UV light from a mercury lamp (I-line). The D4265 has the strongest response, but also includes some sensitivity to blue light as well (H-line), so it may require storage and use in an area with filtered (yellow-light) illumination, as will be appreciated by those skilled in the art.

Several material formulations made with the above monomers and photoinitiators were characterized in terms of their index of refraction and dispersion characteristics. Samples of core and cladding were coated on a silicon substrate and exposed to a dose of 1500 mJ of UV light from a high-pressure mercury light source that outputs approximately 35 mW/cm². The cured samples were then annealed under flowing nitrogen for 1 hour at 125° C. The annealing procedure has the potential to sublime away any low molecular weight species, such as residual uncured monomer and the photoinitiators. The refractive index was measured by a prism coupling measurement on thin films (typically 10 to 50 microns in thickness). Results for the formulation designated EIMM-200 from FIG. 18 are shown in FIG. 7. These results are for the formulations of EIMM-200 core and cladding, which are in line with the values for the InfiniCor SX fiber listed above (and plotted as black squares in the graph of FIG. 18).

As noted above, it may be desirable to design the mechanical properties of the EIMM to match the characteristics needed for the given switch. For example, measurements may be made on the materials formulated using a Differential Scanning calorimeter (DSC) to determine glass transition temperature (Tg), and a Dynamic Mechanical Analyzer (DMA) to determine storage modulus. These values, along with refractive indexes, are recorded in the following table. The data demonstrates that the mechanical and thermal properties may be varied over a very large range through the choice of different recipes for the monomer formulations.

| Measured Characteristics of Acrylate Polymer Films[1] | | | | | |
|---|---|---|---|---|---|
| Formulation | RI @ 1322 nm | RI @ 850 nm | Tg[2] (° C.) | Modulus[3] @ 30° C. (kpsi) | Est. Solid Density (g/cm3) |
| 1a Core | 1.4895 | | 7.44 | 0.3 | 1.08 |
| 1b Core | 1.4904 | | 11.6 | 14.5 | 1.08 |
| 1a Clad | 1.4703 | | 37.3 | 143.8 | 1.04 |
| 1b Clad | 1.4685 | | 32.7 | 137.5 | 1.08 |
| 2 Core | | 1.4669 | | 9.3 to 60[4] | |
| 2 Clad | | 1.4525 | | 2 | |

[1]Solid polymer after anneal at 125 C. for 1 hr under nitrogen.
[2]Tg determined from 1st heating in Differential Scanning Calorimeter (DSC)
[3]Modulus from Dynamic Mechanical Analysis (DMA)
[4]Range depending on cure and thermal history

| Monomer Formulations for Selected Elastomeric Solids | | | | | | | | |
|---|---|---|---|---|---|---|---|---|
| Formulation | F8DA (wt %) | PNGDA (wt %) | EBDA-10 (wt %) | TFPM (wt %) | IOA (wt %) | DEAP (wt %) | D-4265 (wt %) | I-1010 (wt %) |
| 1a Core | | 59.4 | 38.3 | | | 2 | | 0.3 |
| 1b Core | | 59.4 | 38.3 | | | | 2 | 0.3 |
| 1a Clad | 2.8 | 94.9 | | | | 2 | | 0.3 |
| 1b Clad | 10.7 | 82.3 | 4.7 | | | 2 | | 0.3 |
| 2 Core | | 77.2 | | 20.5 | | 1 | 1 | 0.3 |

The EIMM structure or layer may take various forms, one of which is a layer of material that has an index equaling the effective index of the fiber. Again, the EIMM is advantageous over liquid index matching materials in applications such as those shown in FIGS. 15A and 15B because obtaining total internal reflection from the facetted (angled) fiber ends requires an air interface. A liquid would need to be cleanly removed upon cycling of the switch. The solid EIMM accomplishes this requirement on one or both faces, and can optionally form a planar reflective surface in switch state 2 (uncoupled), if left on one of the fiber end facets. The EIMM may be prepared as a free-standing film and subsequently aligned and applied to the fiber end face, or it may be fabricated directly on the fiber end or polished ferrule, as discussed above with reference to FIG. 11. In the former case it is grown on glass or silicon and peeled off after curing. In the latter case, an adhesion promoter may be applied to the fiber end, and the EIMM would then remain rigidly attached, as will be appreciated by those skilled in the art.

Figure 23:
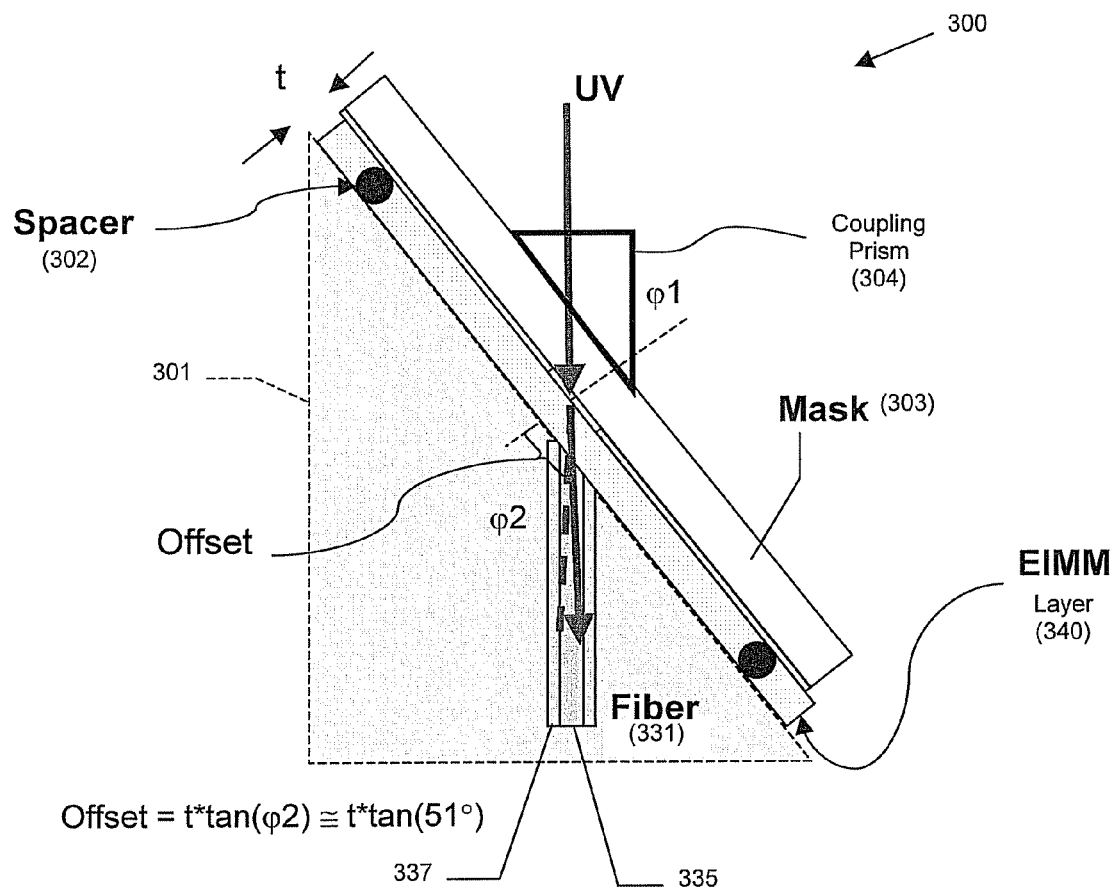
FIG. 23 is a schematic diagram of a fixture for creating angled optical fibers for use in the optical fiber switch of FIGS. 15A and 15B.
Figure 24:
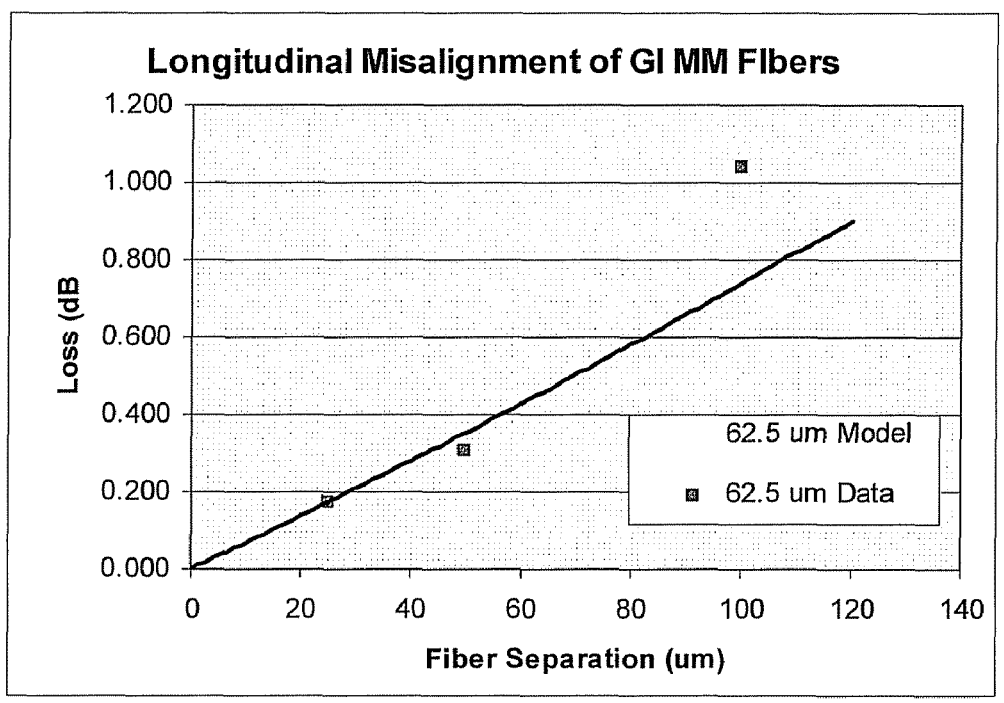
FIG. 24 is a graph of measured to expected fiber-to-fiber loss for an exemplary index matching elastomeric solid material formulation for use in interconnections and optical fiber switches in accordance with the invention.

To fabricate the waveguide on the end of a fiber, the 50-micron core fiber may be angled at 51 degrees to provide total internal reflection at the fiber end for the supported light rays. The waveguide may be coaxial with the fiber. One exemplary fixture 300 for creating this geometry is shown in FIG. 23. The optical fiber 331 may be mounted in a silicon V-groove block 301 and polished at a 51-degree angle, for example. The fiber 331 may remain in the block 301 during the EIMM layer 340 fabrication step. Wire spacers 302 may be used to establish a thickness (t) for the EIMM layer 340, and a mask 303 may be used to define an oval core portion 348 matching the core 335 of the fiber 331, as shown in FIG. 24. Once the mask 303 is properly aligned with the core 335 of the fiber 331, the fixture 300 will be oriented at a 51-degree angle as shown for UV exposure from a vertically collimated light source. A coupling prism 304 may be attached to the mask 303 to allow the UV beam to propagate at a 51-degree angle through the mask and the liquid EIMM monomer, as will be appreciated by those skilled in the art. The mask 303 and the prism 304 may both be made from quartz (silica) and have a refractive index similar to or the same as the EIMM. As the EIMM cures its index will increase, hence there will be some refraction of the UV beam as indicated between the solid and dashed lines for the path of the UV beam.

After the core exposure, the structure may be developed using a solvent mixture of methanol and isopropanol, for example. A second mask (not shown in FIG. 23) including the cladding structures may be used to define a cladding portion 349 that follows the cladding 337 of the fiber 331, as discussed above with reference to FIG. 11. Again, this will produce an EIMM layer 340 on the end of the fiber 331 that has the same geometry as the fiber itself, ending in a 51-degree angle, which will reflect light transversely when the endface is in air and transmit light coaxially when a mating fiber is in contact with the EIMM layer 340.

Exemplary thicknesses which may be used for the EIMM layer 340 in optical fiber switching and interconnection applications may be in a range from about 25 μm to 75 μm, for example, although other thicknesses may also be used. For such thicknesses, a 1-μm deformation of the layer 340 upon closure of the switch will result in a strain that lies between about 4% and 1.3%, respectively. It should be noted that the effective hardness of the layer 340 will be related to the thickness, since for such thin films the hardness of the substrate influences the effective hardness of the polymer.

The EIMM layer 340 may advantageously conform to irregularities at the interface of two temporarily conjoined optical fibers to reduce reflections or scattering losses. A test for pairs of fibers polished at a 45-degree angle was performed which validated this function. For the test, the EIMM polymer was grown on the surface of a fiber polishing block in the shape of a 1 mm×1 mm pad that covered the fiber end. A second fiber also held in its polishing block, but not covered by EIMM, was then used to make an optical connection to the first fiber. This connection was achieved through active alignment, and the minimum transmission loss and maximum reflection loss as measured with an optical time-domain reflectometer (OTDR) were recorded. The test employed Corning InfiniCor CL 1000 62.5-μm fiber. For the test there was no guide structure in the EIMM layer, just a continuous coating of an EIMM material that matched the peak index of the graded index fiber, as will be appreciated by those skilled in the art.

Data taken with various thicknesses of the EIMM are presented in the following table:

| Measured and calculated loss for 1310-nm light transmission through a gap filled with EIMM | | | |
|---|---|---|---|
| Separation (μm) | Calculated Loss for 62.5 Fiber (dB) | Data * @ 1310 (dB) | RL (dB) |
| 5 | 0.034 | | |
| 10 | 0.068 | | |
| 25 | 0.173 | 0.175 | 59 |
| 50 | 0.353 | 0.306 | 71 |
| 100 | 0.738 | 1.037 | 75 |

* Using pad of EIMM-12 Core of thickness (s)

As may be seen, desirable return losses may be achieved (e.g., greater than 70 dB). For the thinnest sample, it is theorized without wishing to be bound thereto that the blocks may not have been sufficiently parallel to allow full approach and optimization of the RL. It should also be noted that the transmission losses were also essentially as low as theory will allow, given that there was no guiding structure. For a graded index fiber of a given NA and radius, a, the expected fiber-to-fiber loss for propagation in a gap, s, filled by a material of index, $n_0$, the following equation represents an expected gap loss relation:

$$\text{Gap\_Loss (dB)} = -10 \cdot \log\left\{1 - \frac{s \cdot NA}{4 \cdot a \cdot n_0}\right\}$$

Data from the above relation is presented for comparison in FIG. 24. It will be noted that the separations of less than about 15 μm may result in transmission loss less than 0.1 dB, even if no waveguide structure is present in the EIMM. As such, the EIMM layer 340 is an effective index matching medium that both suppresses back reflection and enhances transmission, as will be appreciated by those skilled in the art.

Figure 25:
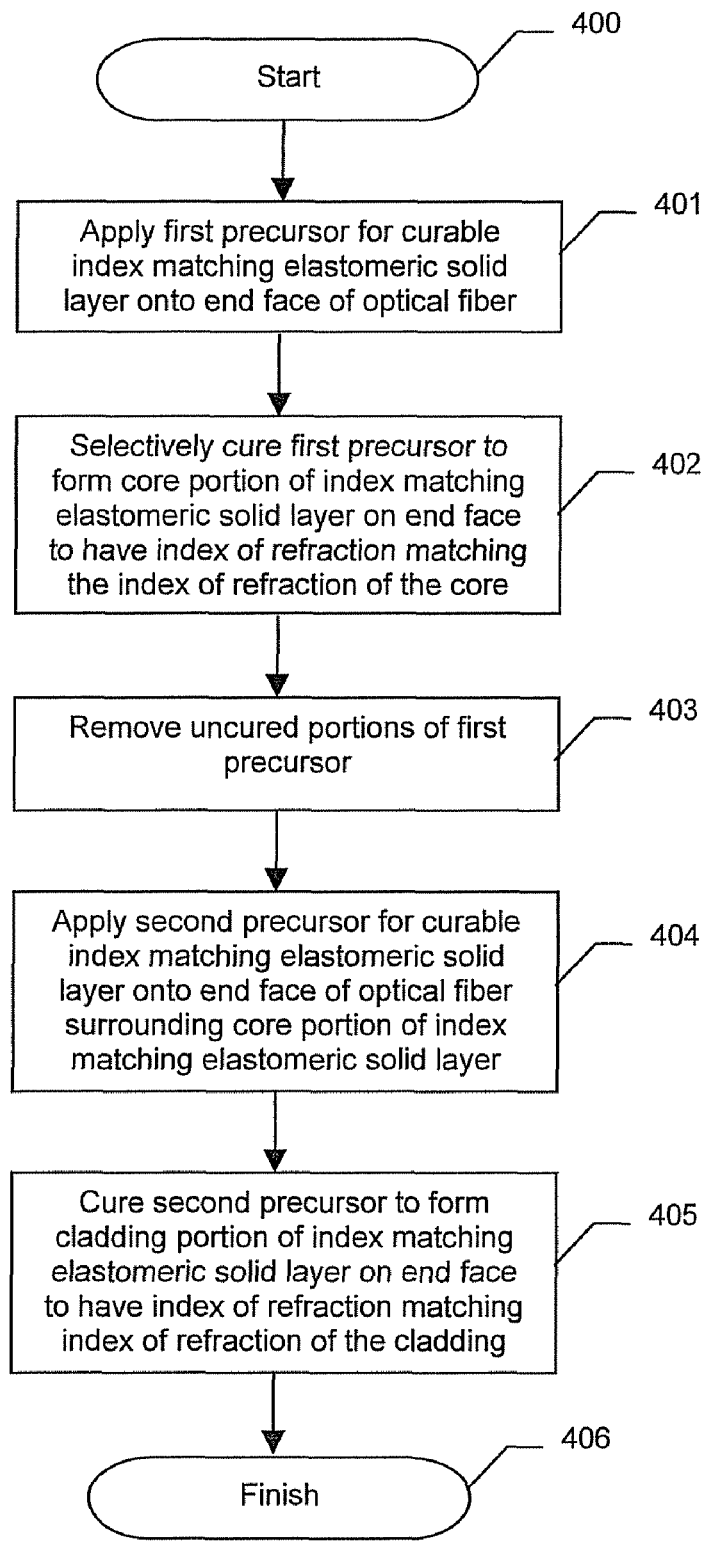
FIGS. 25-28 are flow diagrams illustrating additional method aspects for making optical fiber devices and index matching elastomeric solid layers therefor in accordance with the invention.
Figure 26:
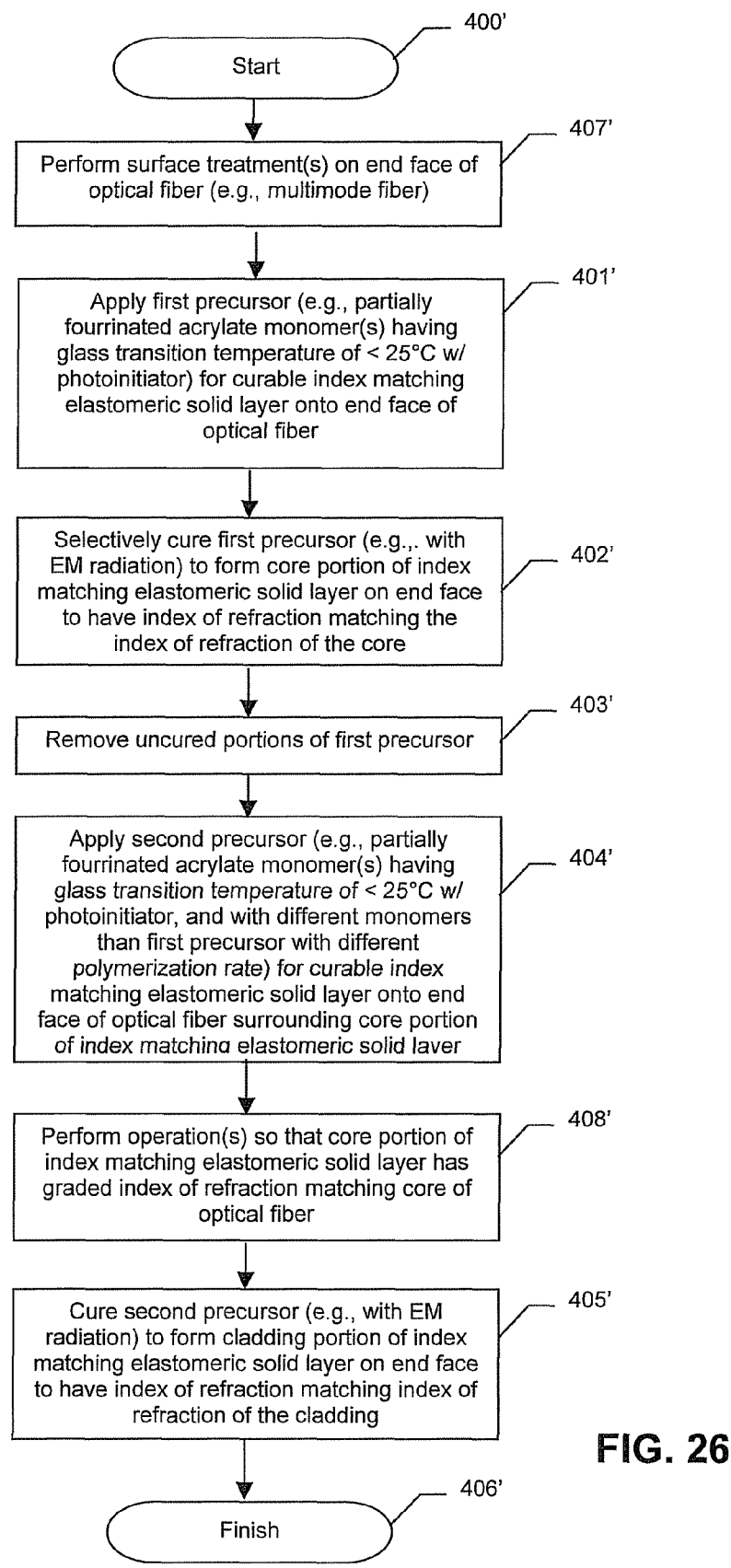

Turning additionally to FIGS. 25 and 26, a method for making an optical device, such as the interconnection 130 discussed above, is now described. However, it should be noted that the techniques described below may also be applied to other optical fiber devices, such as the optical fiber switch 230, optical waveguides, etc. Beginning at Block 400, a first precursor for a curable index matching elastomeric solid layer 140 is applied onto an end face 133 of an optical guide device, such as an optical fiber 131, at Block 401. Other optical guide devices may include a waveguide that is part of a planar optical circuit, an optical chip such as a laser, modulator or other optical component, for example. It should be noted that one or more surface treatment operations (e.g., chemical and/or mechanical polishing) may be performed prior to application of the first precursor, at Block 407'. Moreover, an adhesion promoter, such as an alkoxysilane or a Chlorosilane, may be initially applied to the end face 133 of the fiber 131, if desired.

As discussed above, the first precursor may include one or more partially fluorinated acrylate monomers, which are helpful for index matching of silica. Further, to obtain a desired elastomeric structure that maintains a desired shape, at least some portion of a multifunctional monomer may also be included. Additionally, to obtain a relatively low modulus, which is desirable to allow filling of gaps and surface irregularities during, for example, the mating of two fibers, some portion of the precursor may be a monomer that includes relatively flexible side chains and/or linkages between functional acrylate groups (e.g., generally reflected by having a relatively low glass transition temperature for the homopolymer, such as less than 25° C. and, more particularly, less than 0° C., for example). Furthermore, it may also be desirable that the monomers in the precursor be miscible in the proportions necessary to achieve the above-described attributes, and one or more of the monomers may be liquid at room temperature. Generally speaking, the photoinitiator to be included in the precursor may have a relatively high activity and may be soluble to at least 1%, and more particularly to about 2%, in the liquid formulation of monomers. Again, suitable examples of such monomers and photoinitiators are discussed above with reference to FIGS. 19-21.

The method further illustratively includes selectively curing the first precursor to form a core portion 148 of the index matching elastomeric solid layer 140 on the end face 133 to have an index of refraction $n_1$ matching the index of refraction of the core 135, at Block 402. As discussed above, this may be done using electromagnetic (EM) radiation, such as UV light, for example (Block 402'). The method may also include removing uncured portions of the first precursor, at Block 403, and applying a second precursor for the curable index matching elastomeric solid layer 140 onto the end face 133 of the optical fiber 131 surrounding the core portion 148 of the index matching elastomeric solid layer, at Block 404. The second precursor may include similar components to those discussed above, but adjusted for the different index of refraction $n_2$ of the cladding 137. If a graded index is to be produced, then a set of different monomers that have a difference in polymerization (or cross linking) rate and/or difference in index of refraction may be used (Block 404'), as will be appreciated by those skilled in the art. As noted above, an operation such as performing a soak at an elevated temperature may be used to provide the graded index structure, at Block 408'.

The method further illustratively includes curing the second precursor to form the cladding portion 149 of the index matching elastomeric solid layer 140 on the end face 133 to have an index of refraction $n_2$ matching the index of refraction of the cladding, at Block 405, thus concluding the method illustrated in FIG. 25. Here again, the curing may be achieved through the use of EM radiation, e.g., UV light having the appropriate wavelength to activate the photoinitiator.

In instances where the elastomeric solid layer 140 is to be employed in the interconnection of dissimilar optical fibers or waveguides, where the refractive indices of the respective core and cladding may differ between the fibers and/or waveguides to be connected, the core and cladding indices may advantageously lie between those of the interconnected fibers or waveguides. Choosing an intermediate value for the refractive index of the core of the elastomeric solid layer, as for example, the average of the refractive indices of the cores of the waveguides to be interconnected, can provide a reduction in the optical power lost in the interconnection. Likewise, choosing an intermediate value of the refractive index for the cladding as well as the core of the elastomeric solid layer can further reduce losses in the interconnection. Creating multiple layers of the elastomeric solid where the refractive index of the core and the cladding are progressively changed in a stepwise manner between the values of the two dissimilar fibers or waveguides can lead to even further decrease in loss, as will be appreciated by those skilled in the art.

Figure 27:
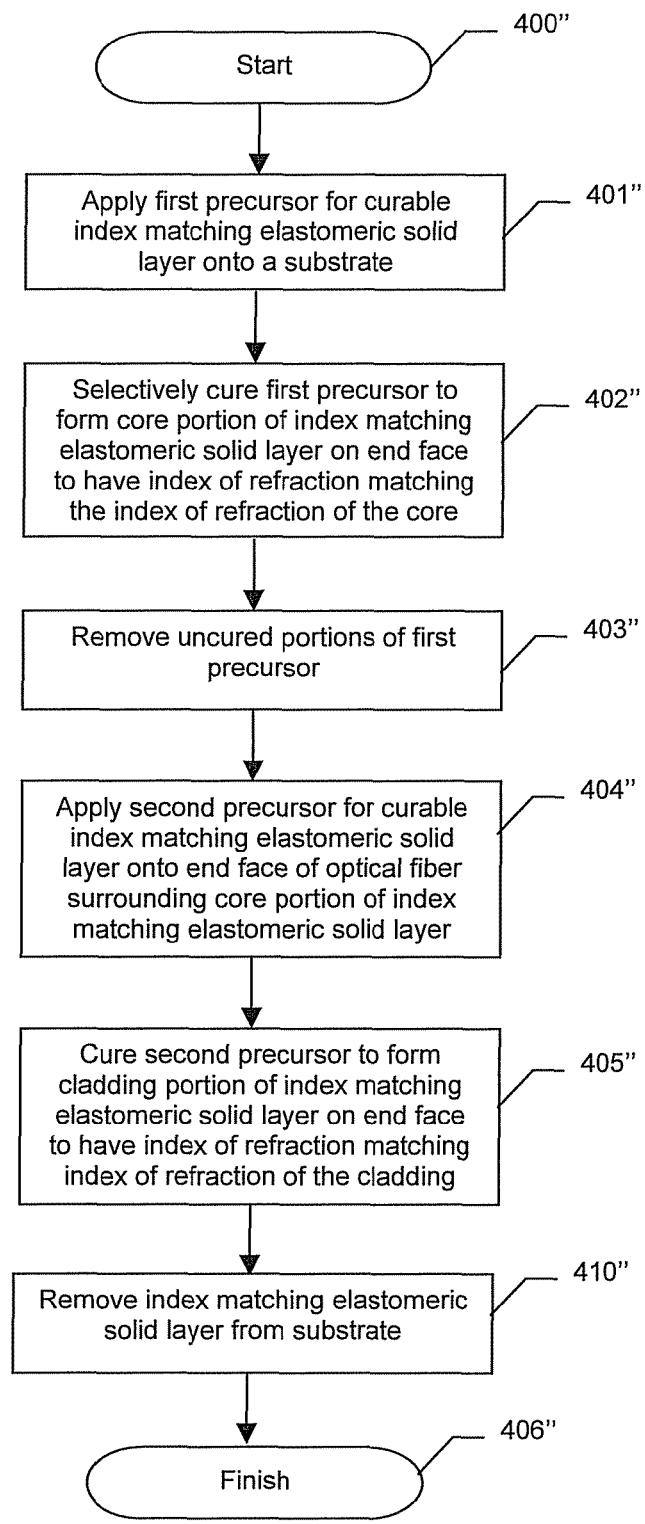

A related method for making an index matching elastomeric solid layer 140 to be positioned onto the end face 133 of an optical fiber 131 is now described with reference to FIG. 27. This method is similar to the one described above with reference to FIGS. 25 and 26, but in this exemplary embodiment the first precursor is applied onto a substrate 109, as described above with reference to FIG. 11 (Block 401"). After curing of the second precursor, the index matching elastomeric solid layer 140 may be removed from the substrate 109, at Block 410", for subsequent placement on an optical fiber, for example, as discussed further above.

Figure 28:
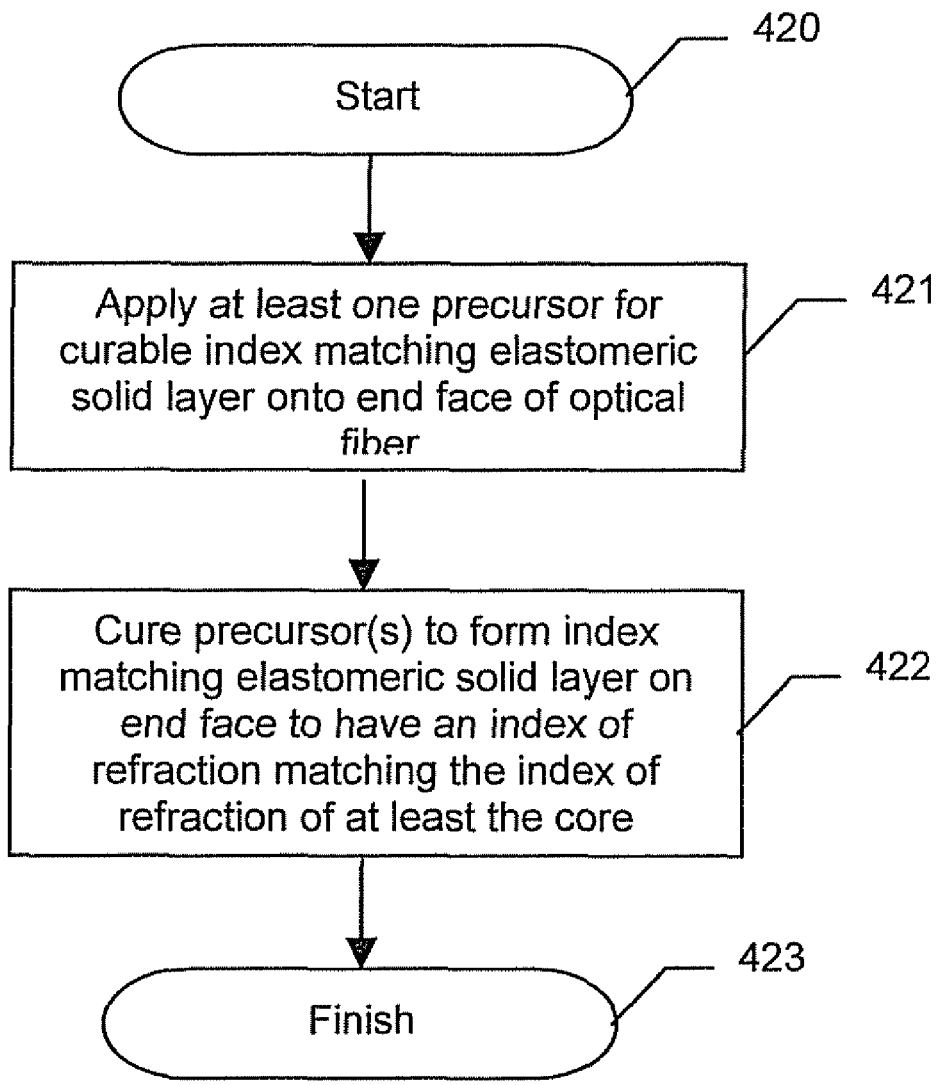

A similar method for making an optical fiber device, such as the interconnection 30, is now described with reference to FIG. 28. Beginning at Block 420, the method illustratively includes applying at least one precursor for a curable index matching elastomeric solid layer 40 onto an end face 33 of an optical fiber 31, at Block 421. The at least one precursor is then cured to form the index matching elastomeric solid layer 40 on the end face 33 to have an index of refraction $n_1$ matching the index of refraction of at least the core 35, at Block 422, thus concluding the illustrated method (Block 423). In some embodiments, the curable index matching elastomeric solid layer 40 may also match the index of refraction $n_2$ of the cladding 37, as discussed above.

Additional features of the invention may be found in the co-pending patent applications filed concurrently herewith and assigned to the Assignee of the present invention entitled A REPEATABLE OPTICAL WAVEGUIDE INTERCONNECTION INCLUDING AN INDEX MATCHING ELASTOMERIC SOLID LAYER AND RELATED METHODS, attorney docket no. GCSD-2172 (61703); A REPEATABLE OPTICAL FIBER INTERCONNECTION INCLUDING AN INDEX MATCHING ELASTOMERIC SOLID LAYER PROVIDING CORE AND CLADDING INDEX OF REFRACTION MATCHING AND RELATED METHODS, attorney docket number GCSD-2173 (61704); OPTICAL FIBER SWITCH INCLUDING AN INDEX MATCHING ELASTOMERIC SOLID LAYER PROVIDING CORE AND CLADDING INDEX OF REFRACTION MATCHING AND RELATED METHODS, attorney docket number GCSD-2175 (61706); and METHOD FOR MAKING AN OPTICAL FIBER DEVICE INCLUDING A CURABLE INDEX MATCHING ELASTOMERIC SOLID LAYER, attorney docket number GCSD-2176 (61707), the entire disclosures of which are hereby incorporated herein in their entirety by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An optical fiber switch comprising:
    first and second angled optical fibers having respective first and second end faces, each of said first and second angled optical fibers comprising
       a core having a core index of refraction, and
       a cladding surrounding said core and having a cladding index of refraction different than the core index of refraction;
    a first index matching elastomeric solid layer having a proximal face coupled to the first end face and a distal face opposite the proximal face to be repeatably optically coupled to the second end face, said first index matching elastomeric solid layer having an index of refraction matching at least the index of refraction of said core; and
    at least one actuator for relatively moving said first and second angled optical fibers between a coupled position and an uncoupled position.

2. The optical fiber switch of claim 1 wherein said proximal end face is chemically bound to the first end face; and wherein the distal end face is low-tack to be repeatably directly mechanically coupled to the second end face.

3. The optical fiber switch of claim 2 wherein the low-tack distal face of said first index matching elastomeric solid layer has surface properties defining a wetted interface devoid of air pockets with said second end face when pressed thereagainst.

4. The optical fiber switch of claim 2 further comprising a second index matching elastomeric solid layer having a proximal end face chemically bound to the second end face and a low-tack distal face opposite the proximal face to be repeatably optically and mechanically coupled to the low-tack distal face of said first index matching elastomeric solid layer.

5. The optical fiber switch of claim 1 wherein said first angled optical fiber comprises a first pair of transverse optical fiber ends joined together; and wherein said second angled optical fiber comprises a second pair of transverse optical fiber ends joined together.

6. The optical fiber switch of claim 1 wherein said first index matching elastomeric solid layer comprises an acrylate polymer.

7. The optical fiber switch of claim 1 wherein said first end face has a canted angle from perpendicular to an axis of said first optical fiber; and wherein said first index matching elastomeric solid layer has a uniform thickness and matches the canted angle.

8. The optical fiber switch of claim 1 wherein said first index matching elastomeric solid layer has a radially uniform index of refraction matching the core at a desired operating wavelength.

9. The optical fiber switch of claim 1 wherein each of said first and second optical fibers comprises glass.

10. The optical fiber switch of claim 1 wherein each of said first and second optical fibers comprises a multimode optical fiber.

11. The optical fiber switch of claim 1 wherein said at least one actuator comprises at least one piezoelectric actuator.

12. An optical fiber switch comprising:
    first and second angled optical fibers having respective first and second end faces, each of said first and second angled optical fibers comprising
       a core having a core index of refraction, and
       a cladding surrounding said core and having a cladding index of refraction less than the core index of refraction;
    a first index matching elastomeric solid layer having a proximal face chemically bound to the first end face and a low-tack distal face opposite the proximal face to be repeatably optically and directly mechanically coupled to the second end face, said first index matching elastomeric solid layer having an index of refraction matching at least the index of refraction of said core; and
    at least one actuator for relatively moving said first and second angled optical fibers between a coupled position and an uncoupled position;
    said first angled optical fiber comprising a first pair of transverse optical fiber ends joined together, and said second angled optical fiber comprising a second pair of transverse optical fiber ends joined together.

13. The optical fiber switch of claim 12 wherein the low-tack distal face of said first index matching elastomeric solid layer has surface properties defining a wetted interface devoid of air pockets with said second end face when pressed thereagainst.

14. The optical fiber switch of claim 12 further comprising a second index matching elastomeric solid layer having a proximal end face chemically bound to the second end face and a low-tack distal face opposite the proximal face to be repeatably optically and mechanically coupled to the low-tack distal face of said first index matching elastomeric solid layer.

15. The optical fiber switch of claim 12 wherein said first index matching elastomeric solid layer comprises an acrylate polymer.

16. A method for making an optical fiber switch comprising:
    forming first and second angled optical fibers having respective first and second end faces, each of the first and second angled optical fibers comprising
       a core having a core index of refraction, and
       a cladding surrounding the core and having a cladding index of refraction different than the core index of refraction;
    forming a first index matching elastomeric solid layer having a proximal face coupled to the first end face and a distal face opposite the proximal face to be repeatably optically coupled to the second end face, the first index matching elastomeric solid layer having an index of refraction matching at least the index of refraction of the core; and
    positioning at least one actuator for relatively moving the first and second angled optical fibers between a coupled position and an uncoupled position.

17. The method of claim 16 wherein the proximal end face is chemically bound to the first end face; and wherein the distal end face is low-tack to be repeatably directly mechanically coupled to the second end face.

18. The method of claim 17 wherein the low-tack distal face of the first index matching elastomeric solid layer has surface properties defining a wetted interface devoid of air pockets with the second end face when pressed thereagainst.

19. The method of claim 17 further comprising forming a second index matching elastomeric solid layer having a proximal end face chemically bound to the second end face and a low-tack distal face opposite the proximal face to be repeatably optically and mechanically coupled to the low-tack distal face of the first index matching elastomeric solid layer.

20. The method of claim 16 wherein forming the first angled optical fiber comprises forming a first pair of transverse optical fiber ends joined together; and wherein forming the second angled optical fiber comprises forming a second pair of transverse optical fiber ends joined together.

* * * * *